United States Patent
Liu et al.

(10) Patent No.: US 9,366,895 B2
(45) Date of Patent: Jun. 14, 2016

(54) LIQUID CRYSTAL DISPLAY WITH POLYMER LAYER OF VARYING THICKNESS AND METHOD OF PRODUCING SUCH A LAYER

(75) Inventors: Qin Liu, Corvallis, OR (US); Bradley Chung, Corvallis, OR (US); John Christopher Rudin, Bristol (GB); Frank E. Glass, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1737 days.

(21) Appl. No.: 12/375,511

(22) PCT Filed: Jul. 25, 2007

(86) PCT No.: PCT/US2007/074288
§ 371 (c)(1),
(2), (4) Date: May 5, 2009

(87) PCT Pub. No.: WO2008/014302
PCT Pub. Date: Jan. 31, 2008

(65) Prior Publication Data
US 2009/0274911 A1 Nov. 5, 2009

(51) Int. Cl.
*B32B 27/38* (2006.01)
*B05D 5/06* (2006.01)
*G02F 1/1333* (2006.01)

(52) U.S. Cl.
CPC .... *G02F 1/133371* (2013.01); *G02F 1/133345* (2013.01); *G02F 2202/022* (2013.01); *Y10T 428/31515* (2015.04)

(58) Field of Classification Search
None
See application file for complete search history.

(56) References Cited

U.S. PATENT DOCUMENTS

| | | | |
|---|---|---|---|
| 5,024,918 A | 6/1991 | Porter et al. | |
| 5,168,383 A | 12/1992 | Iwaki | |
| 5,493,429 A | 2/1996 | Kanemoto | |
| 5,531,111 A | 7/1996 | Okamoto | |
| 5,956,112 A * | 9/1999 | Fujimori et al. | 349/156 |
| 5,976,284 A | 11/1999 | Calvert | |
| 6,693,697 B2 | 2/2004 | Sakamoto | |
| 2003/0114606 A1* | 6/2003 | Taniguchi et al. | 525/523 |
| 2004/0041969 A1* | 3/2004 | Tahon et al. | 349/123 |
| 2004/0164927 A1* | 8/2004 | Suyama et al. | 345/32 |
| 2005/0037281 A1* | 2/2005 | Sato et al. | 430/270.1 |

FOREIGN PATENT DOCUMENTS

| | | |
|---|---|---|
| EP | 1674923 | 6/2006 |
| JP | 62-262022 | * 11/1987 |
| WO | 2007044107 | 4/2007 |

OTHER PUBLICATIONS

JP 62-262022 Abstract Translation, Nov. 14, 1987.*
ICIS.com Titanium Dioxide (TiO2) Uses and Market Data, http://www.icis.com/v2/chemicals/9076546/titanium-dioxide/uses.html . Retrieved on Sep. 8, 2011.*
DOW, Product Safety Assessment: Bisphenol A Diglycidyl Ether, http://www.dow.com/productsafety/finder/bisphenol.htm . Retrieved on Sep. 8, 2011.*

(Continued)

Primary Examiner — Coris Fung
(74) Attorney, Agent, or Firm — Timothy F. Myers

(57) ABSTRACT

Various methods and apparatus relating to a multi-level layer (140, 440, 540, 640, 740) are disclosed.

16 Claims, 14 Drawing Sheets

(56) References Cited

OTHER PUBLICATIONS

Dow: Bisphenol A Diglycidyl Ether; http://www.dow.com/productsafety/finder/bisphenol.htm. Retrieved on Feb. 6, 2012.*
MacMillan Dictionary: Transparent; http://www.macmillandictionary.com/dictionary/american/transparent. Retrieved on Feb. 6, 2012.*
MacMillan Dictionary: Colorless; http://www.macmillandictionary.com/dictionary/american/colorless. Retrieved on Feb. 6, 2012.*
Shirai, human translation on JP 62-2620022, Nov. 14, 1987.*
LookChem—bisphenol A diglycidyl ether. Retreived on Sep. 12, 2012. http://www.lookchem.com/cas-167/1675-54-3.html.*
Merriam-Webster Dictionary—ramp. Retrieved on Sep. 12, 2012. http://www.merriam-webster.com/dictionary/ramp.*
Cambridge Dictionary—solid. Retrieved in Sep. 12, 2012. http://dictionary.cambridge.org/dictionary/british/solid_1.*
Document Reference Citation: Jun. 28, 2006; EP1674923 Kitson et al; ;.
Document Reference Citation: Jun. 29, 1989; DE3842507 Kobyashi Kesanao; ;.
Document Reference Citation: Improving the Process Capability of SU-8, Part II; DW Johnson et al; MicroChem Corp; 7 pages.
Document Reference Citation: improving the Process Capability of SU-8; M. Shaw et al; MicroChem Corp; 9 pages.

* cited by examiner ically illustrating an alternative method for forming the multi-level layer of FIG. 4 according to one example embodiment.

LIQUID CRYSTAL DISPLAY WITH POLYMER LAYER OF VARYING THICKNESS AND METHOD OF PRODUCING SUCH A LAYER

CROSS-REFERENCE TO RELATED PATENT APPLICATION

The present application is a continuation of, and claims priority to, International Application No. PCT/US2007/074288 entitled "Liquid Crystal Display Device With Polymer Layer Of Varying Thickness And Method Of Producing Such A Layer," which was filed on Jul. 25, 2007.

BACKGROUND

Applications sometimes require a layer or structure having distinct levels or thicknesses. Existing methods for fabricating such multiple levels require a relatively large number of process steps, increasing fabrication costs and complexity.

DETAILED DESCRIPTION OF THE EXAMPLE EMBODIMENTS

Figure 1:
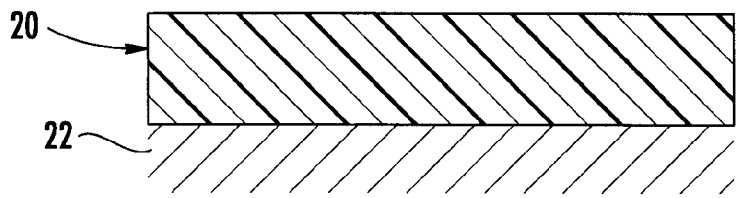
FIGS. 1-4 are side elevational views schematically illustrating one example of a method for forming a multi-level layer according to one example embodiment.
Figure 2:
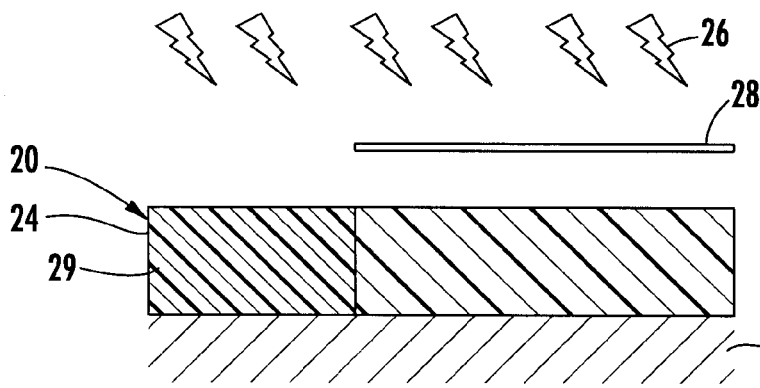
Figure 3:
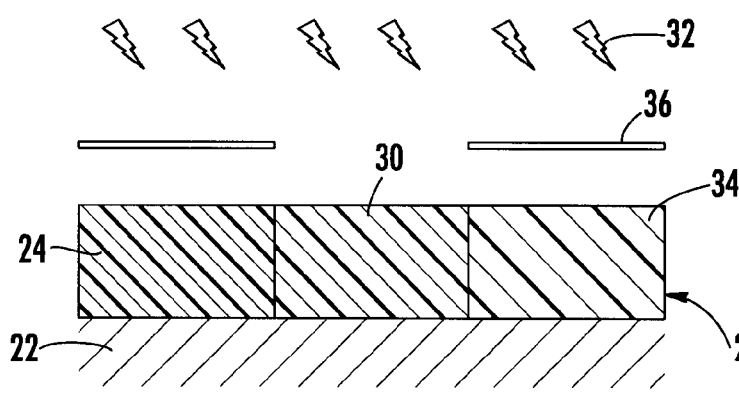
Figure 4:
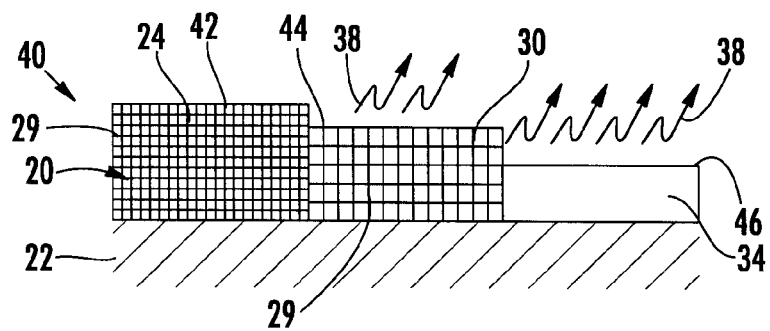

FIGS. 1-4 schematically illustrate one example of a method for forming a multi-level structure or layer 40 (shown in FIG. 4). As shown by FIG. 1, a layer 20 of one or more materials is initially provided. In the particular embodiment illustrated, layer 20 is formed upon substrate 22. In one embodiment, layer 20 is spun upon substrate 22. In other embodiments, layer 20 may be deposited or positioned adjacent to substrate 22 in other fashions.

Substrate 22 may constitute any structure configured to support layer 20. Substrate 22 may be electrically conductive or dielectric. Substrate 22 may be transparent, partially transmissive or opaque.

Layer 20 constitutes one or more layers of one or more materials configured to exhibit a loss or reduction in thickness upon being heated. In one embodiment, layer 20 is formed from materials configured to exhibit a loss or reduction in thickness based at least in part upon exposure of layer 20 to radiation. In one embodiment, layer 20 includes a material configured to exhibit a loss of thickness based at least upon an extent to which layer 20 is heated. In the particular embodiment illustrated, layer 20 includes a material that exhibits a loss of thickness based upon both a degree of exposure of the material to radiation and a subsequent extent of heating of the material.

According to one embodiment, layer 20 includes a material that exhibits a loss of thickness based upon a degree of exposure to ultra-violet radiation. In one embodiment, layer 20 includes a material that exhibits a loss of thickness based at least in part upon heating of the material or layer to a temperature of at least 170 degrees Celsius. In one embodiment, layer 20 includes a material configured to generate various amounts of at least one cross-linking catalyst in response to being exposed to various degrees of radiation, wherein the various amounts of cross-linking catalysts generated results in different degrees of cross-linking during heating such that different percentages of materials in the layer are released, volatized or sublimed during heating.

In one embodiment, layer 20 includes a photo polymer that generates a photo acid in response to being exposed to radiation, such as ultra-violet radiation. In one embodiment, layer 20 includes a negative photo resist polymer. Layer 20 cross-links in response to being heated. During such heating, one or more volatile reactive molecules (VRMs) are released, volatized or sublimed from the material, resulting in layer 20 exhibiting a loss of thickness. The degree to which the VRMs are released, volatized or sublimed from the remainder of layer 20 may vary depending upon the degree to which the one or more VRMs are bound in the polymeric matrix as a result of the level or degree of cross-linking. In one embodiment, Layer 20 may include a volatile reactive molecule such as a monomer. In one particular embodiment, layer 20 constitutes a layer of a bisphenol-A novolac epoxy resin such as a fully epoxidized bisphenol-A/formaldehyde novolac copolymer combined with an appropriate photo acid generator (one example is sometimes referred to as SU8). One example of SU8 is: NANO SU8-5 commercially available from Micro-Chem Corporation, Newton, Mass.

FIGS. 2 and 3 illustrate selectively exposing portions of layer 20 to distinct exposure doses of radiation. As shown by FIG. 2, a first portion 24 of layer 20 is initially exposed to a first dose 26 of radiation, such as UV radiation, while a remainder of layer 20 remains unexposed to the dose 26 of radiation. In the particular example illustrated, portions of layer 20 are selectively exposed to dose 26 of radiation using a mask 28. Mask 28 is configured to substantially attenuate transmission of dose 26 of radiation. In one embodiment in which the radiation constitutes ultra-violet radiation, mask 28 is configured to substantially attenuate ultra-violet radiation. As a result of being exposed to dose 26, portion 24 of layer 20 generates a cross-linking catalyst such as photo acids 29 (schematically illustrated by hatching). Unexposed portions of layer 20 generate little if any cross-linking catalysts as illustrated and schematically represented by the less dense hatching.

As shown by FIG. 3, portion 30 of layer 20 is exposed to exposure dose 32, while portions 24 and 34 are not substantially exposed to dose 32 of the radiation. As schematically illustrated, dose 32 is relatively less than dose 26. In one embodiment, dose 32 may have a shorter duration. In another embodiment, dose 32 may have a lesser intensity. As a result, portion 30 of layer 20 generates a lesser amount of one or more cross-linking catalysts such as photo acids (as schematically represented by the lesser dense hatching). As shown in FIG. 4, portion 34 generates little if any cross-linking catalysts 29 (as schematically represented by the even lesser dense hatching).

In the particular example illustrated, mask 36 is used to substantially attenuate transmission of dose 32 of radiation to portions 24 and 34 while permitting transmission of dose 32 to portion 30. In other embodiments, selective exposure of layer 20 to radiation may be performed in other manners.

As shown by FIG. 4, after selective exposure of portions of layer 20 to radiation, such as ultra-violet radiation, layer 20 is heated. As a result, cross-linking catalyst 29 in portions 24 and 30 (shown in FIG. 3) cause or initiate cross-linking of portions 24 and 30. As further shown by FIG. 4, a different amount of cross-linking catalysts 29 in portions 24 and 30 result in portions 24 and 30 cross-linking to different extents as schematically represented by the denser grid or matrix associated with portion 24 as compared to the lesser dense grid or matrix associated with portion 30. As schematically represented by the lack of a grid or matrix, portion 34 has an even lesser degree or extent of cross-linking as compared to portion 30.

As further shown by FIG. 4, during heating, elements or material 38 are released, volatized or sublimed from portions 30 and 34 to a greater extent as compared to any material that is released, volatized or sublimed from portion 24. As shown by FIG. 4, the material or elements released, volatized or sublimed from portion 34 exceeds that removed from portion 30. As a result, portion 30 has a greater mass loss and reduction in thickness as compared to portion 24. Likewise, portion 34 has a greater percent mass loss and greater reduction in thickness as compared to portion 30. This results in the formation of distinct levels 42, 44 and 46 on portions 24, 30 and 34, respectively.

In one particular embodiment, the material 38 released, volatized or sublimed from portions 30 and 34 constitutes a VRM such as a monomer. In one embodiment in which layer 20 includes SU8, material 38 constitutes bisphenol A diglycidyl ether (BADGE monomer) in the SU8 material of layer 20. In other embodiments, other VRMs, monomers or materials may be released, volatized or sublimed from one or more of portions 24, 30 and 34 to form levels 42, 44 and 46.

The resulting multi-level layer 40 shown in FIG. 4 includes distinct portions 24, 30 and 34. Each of portions 24, 30 and 34 has a distinct level or degree of cross-linking. Each of portions 24, 30 and 34 also has a distinct remaining concentration and molecular weight distribution of a VRM, such as a monomer material, that has not been removed. In particular, each of portions 24, 30 and 34 may have a distinct amount of VRM such as BADGE, remaining after the heating step in FIG. 4. The distinct levels 42, 44 and 46 of layer 40 may serve one of several potential functions in several applications as will be described hereafter.

Figure 5A:
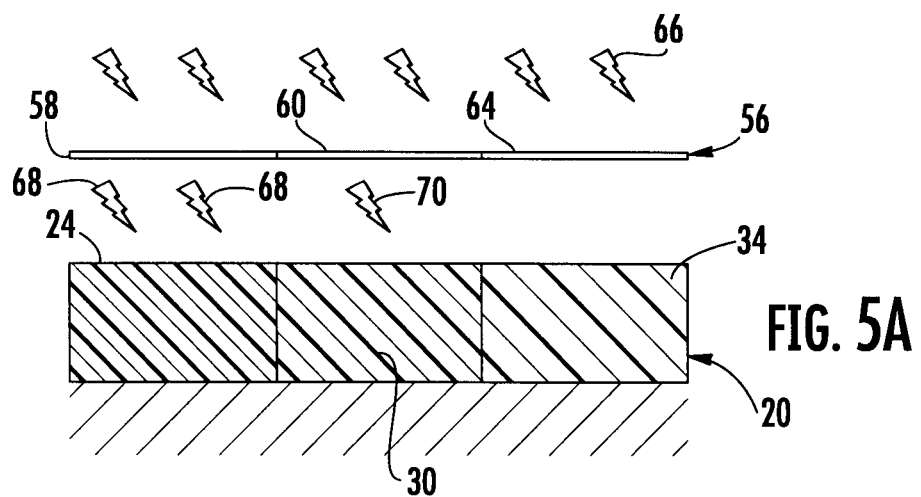
FIG. 5A is a side elevational view schematically illustrating an alternative method for forming the multi-level layer of FIG. 4 according to one example embodiment.
Figure 5B:
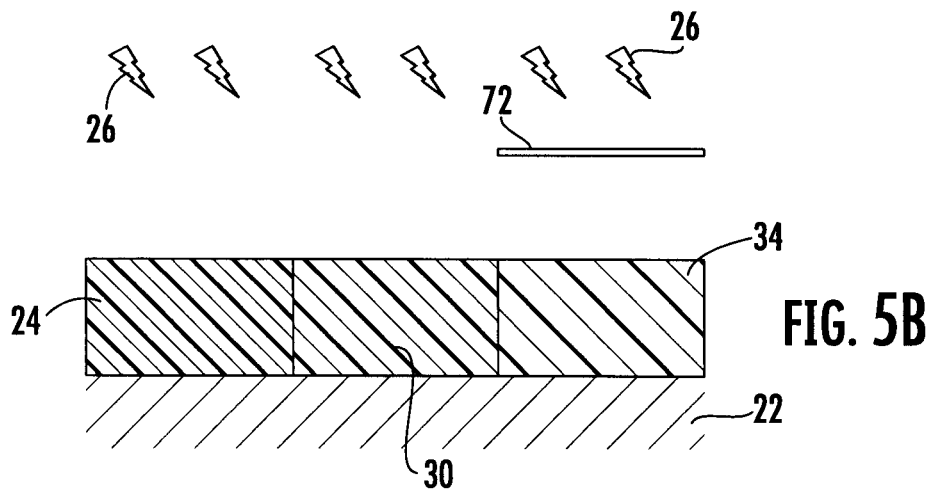
FIG. 5B is a side elevational view schematically illustrating another method for forming the multi-level layer of FIG. 4 according to one example embodiment.

FIGS. 5A and 5B illustrate alternative methods for selectively exposing portions of layer 20 to distinct exposure doses of radiation. FIG. 5A illustrates an alternative method of exposing layer 20 to radiation in lieu of the steps illustrated in steps 2 and 3. As shown in FIG. 5A, in lieu of masks 28 and 36 (shown and described with respect to FIGS. 2 and 3), mask 56 is alternatively used to selectively expose portions of layer 20 to distinct exposure doses of radiation. In particular, mask 56 includes portions 58, 60 and 64 which substantially correspond to the desired size and shape of portions 24, 30 and 34 of layer 20. Portions 58, 60 and 64 of mask 56 have distinct radiation transmissiveness. In the particular example illustrated, portions 58, 60 and 64 are each configured to transmit different intensities of ultra-violet radiation to layer 20. In the example shown, portion 58 is configured to transmit the greatest intensity of UV radiation to portion 24. Portion 60 is configured to transmit a lesser intensity of UV radiation to portion 30. Portion 64 is configured to transmit a level of ultra-violet radiation less than both portions 58 and 60. In one embodiment, mask 56 constitutes a grayscale mask such as a High Energy Beam Sensitive glass mask commercially available from Canyon Materials, Inc., San Diego, Calif.

As shown by FIG. 5A, mask 56 facilitates selective exposure of portions 24, 30 and 34 with a single period of exposure of a single dose 66 which is effectively filtered by mask 56 such that portions 24, 30 and 34 receive distinct exposure doses 68, 70 and substantially no dose, respectively, (as schematically illustrated by bolts 68 and 70). Following the steps shown in FIG. 5A, multi-level layer 40 (shown in FIG. 4) may be formed by heating layer 20 of FIG. 5A.

FIG. 5B schematically illustrates another method of selectively exposing portions of layer 20 to distinct exposure doses of radiation. FIGURE SB schematically illustrates an alternative to the step shown in FIG. 3. In particular, FIG. 5B illustrates selectively exposing portions of layer 20 to distinct exposure doses of radiation by varying the time of exposure that different portions are exposed to radiation such as ultra-violet radiation. As discussed above in FIG. 2, portion 24 of layer 20 is exposed for a first period of time to radiation dose 26 while a remainder of layer 20 has minimal or no exposure. As shown by FIG. 5B, in a subsequent step, portion 24 is once again exposed to dose 26 of ultra-violet radiation. However, portion 30 is also exposed to dose 26 while portion 34 remains unexposed. In the particular example shown, a mask 72 is utilized to expose portions 24 and 30 to radiation while substantially blocking or attenuating transmission of UV radiation to portion 34. In other embodiments, a single mask may be used where the mask is moved or reconfigured. In other embodiments, the dose 26 of radiation applied to portions 24 and 30 in FIG. 5B may alternatively have a distinct intensity or duration as compared to dose 26 that was applied in the step illustrated in FIG. 2.

Because portion 24 is subjected to radiation for a longer total period of time as compared to portions 30 and 34, a larger amount of cross-linking catalysts are generated in portion 24. Likewise, because portion 30 is exposed to a longer duration as compared to portion 34, a greater amount of cross-linking catalysts are generated in portion 30 as compared to portion 34. As discussed above with respect to FIG. 4, the different levels of cross-linking catalysts generated in portions 24, 30 and 34 result in distinct degrees of thickness loss in portions 24, 30 and 34 to form levels 42, 44 and 46 in the finished multi-level layer 40 shown in FIG. 4.

Overall, the process or method shown in FIGS. 1-4, 5A and 5B facilitates fabrication of a single layer of material having multiple distinct levels with fewer individual processing steps and at a lower cost. In particular, the method illustrated in FIGS. 1-4, 5A and 5B forms a multi-level layer 40 (shown in FIG. 4) which utilizes a single coating process (FIG. 1). Because thickness variations are achieved based upon different levels of cross-linking and by volatizing materials from layer 20, developing processes, etching processes and stripping processes may be omitted. In addition, the described process utilizes minimal consumables and may result in minimal process waste disposal. Using grayscale masks, such as mask 56 shown in FIG. 5A, highly repeatable analog changes in thickness may be achieved. In sum, the general method described in FIGS. 1-4, 5A and 5B facilitates low-cost fabrication of multi-level layers or structures.

Figure 6:
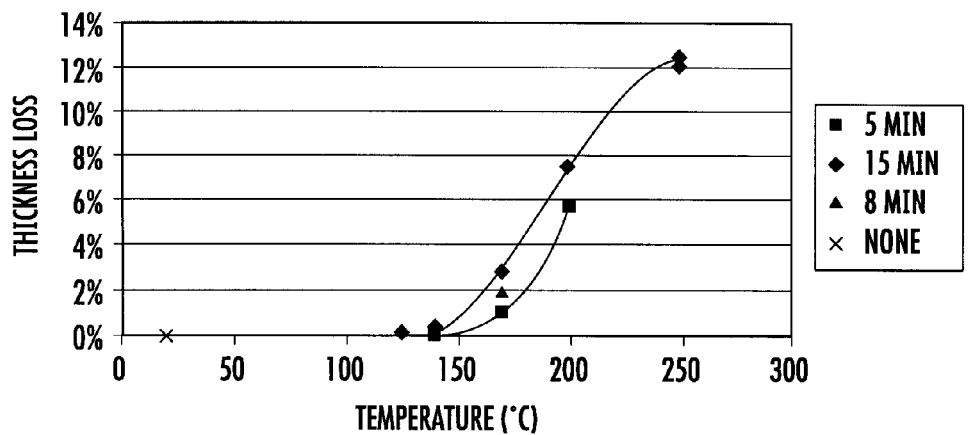
FIG. 6 is a graph illustrating a percent thickness change as a function of different heating according to one example embodiment.

FIG. 6 graphically illustrates thickness loss of a layer of unexposed SU8 as a function of time and temperature at which the layer was heated. As shown by FIG. 6, materials within the SU8 layer, such as a monomer BADGE, begin volatizing, subliming or being released from the layer at a temperature of about 130 degrees. The degree to which such materials are released from the layer to produce changes in thickness of the layer greatly increases when the layer is heated at a temperature of at least about 170 degrees. Heating the unexposed layer of SU8 at 250 degrees for 15 minutes yielded the greatest percent thickness loss of the layer.

Figure 7:
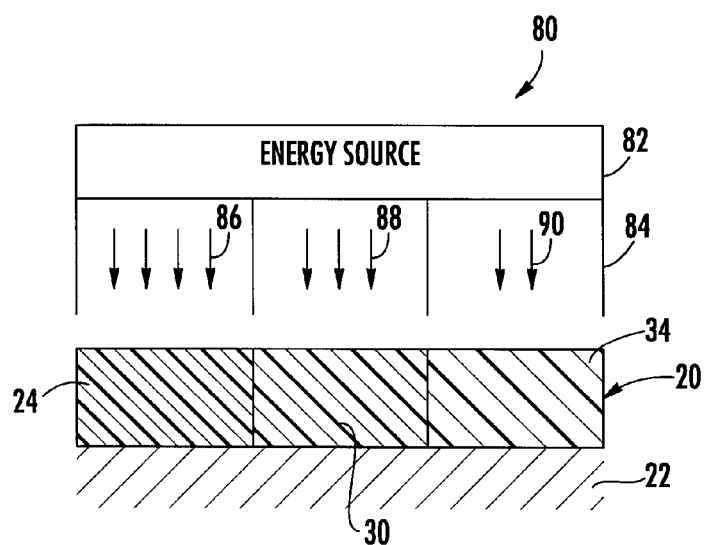
FIG. 7 is a side elevational view schematically illustrating another method for forming a multi-level layer according to one example embodiment.

FIG. 7 schematically illustrates another method for forming multi-level layer 40 shown in FIG. 4. As shown in FIG. 7, in lieu of or in addition to exposing portions 24, 30 and 34 to distinct doses of ultra-violet radiation to form distinct levels 42, 44 and 46 of layer 40 (shown in FIG. 4), portions 24, 30 and 34 may be subjected to different amounts of heating by varying one or both of the time and temperature at which portions 24, 30 and 34 are heated.

In one embodiment, portions 24, 30 and 34 may be subjected to different levels of heating using a heating device 80 which includes an energy source 82 and one or more structures 84 (schematically illustrated) for applying different levels of heat or different levels of energy as schematically represented by arrows 86, 88 and 90 to portions 24, 30 and 34, respectively. In one embodiment, energy source 82 may emit a substantially uniform level of heat across layer 20 while structure 84 constitutes a masking device that thermally insulates portions 24, 30 and 34 to different extents from heat provided by the energy source 82. In another embodiment, energy source 82 may emit distinct levels of heat in distinct zones separated by heat shields and aligned with portions 24, 30 and 34. In still another embodiment, heating device 80 may constitute a laser configured to selectively apply different levels of energy to portions 24, 30 and 34 by varying the intensity of the laser or the duration at which the laser is applied to portions 24, 30 and 34. In one embodiment, the heat may be applied to layer 20 without layer 20 being exposed to ultra-violet radiation. In other embodiments, such selective heating of layer 20 may be performed after layer 20 has been exposed to ultra-violet radiation. In embodiments in which different levels of heat or energy are used to form different levels, an optional final two steps of exposing of layer 20 to an unmasked dose of radiation followed by heating of layer 20 to bind any remaining monomer into place can be performed to substantially eliminate any further monomer evaporation over time.

As shown in FIG. 6 above, subjecting unexposed SU8 to a temperature of 250 degrees for about 15 minutes resulted in a 12 percent loss of overall thickness of the SU8 layer. In particular applications, it may be beneficial to achieve greater percent thickness losses.

Figure 8:
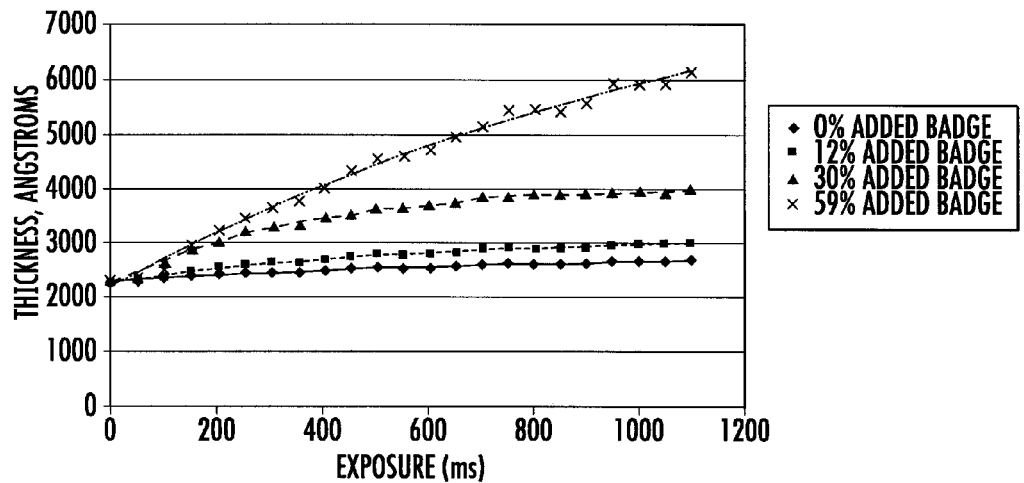
FIG. 8 is a graph illustrating the thickness of layers of material having different levels of a monomer as a function of radiation exposure according to one example embodiment.

FIG. 8 is a graph illustrating various thicknesses of layers of SU8 having different amounts of added monomer, such as BADGE, as a result of being exposed to UV radiation to different extents then being heated at a temperature of at least 250 degrees C. for 2 minutes. In the example shown in FIG. 8, the layers are exposed to UV light having a wavelength of 365 nanometers for different periods of time given in milliseconds (ms). The intensity of the light is such that energy is applied at a rate of 0.5 millijoules per centimeter squared per millisecond. As shown by FIG. 8, for a fixed amount of added monomer, higher exposure levels of SU8 to ultra-violet radiation result in thicker final films after being heated at a temperature of 250 C for at least 2 minutes. In addition, as the amount of BADGE, as a percentage of total solids of the SU8, is increased, the percent difference between the thickness of two different areas subjected to fixed differences of exposure to ultra-violet radiation and subsequently heated at the same temperature for the same duration also increases. In particular, it has been found that the percent thickness loss of SU8 after being exposed and heated may be defined as follows:

$$L = Re^{-kd}/(B+R)*100 \text{ where:}$$

L=percent loss of thickness;
B=a predetermined floor constant;
R=a range constant;
k=a constant; and
d=exposure dose FIG. 9 graphically illustrates percentage thickness loss of a layer of unexposed SU8 as a function of addition of a monomer such as BADGE above the level of BADGE contained in commercially available SU8. The level of BADGE contained in commercially available SU8 is estimated to be between approximately 15-20 percent by mass. In the particular examples illustrated, the layer of SU8 experienced an approximately 18 percent loss of thickness upon being heated as compared to the same heating of the same SU8 that had been exposed to high doses of ultra-violet radiation, where high is defined here as at least about 3000 ms. The 18 percent thickness loss exhibited by the unexposed SU8 of FIG. 8 as compared to the approximately 12 percent thickness loss of the unexposed SU8 of FIG. 6 is believed to be the result of the layer of FIG. 9 being thinner, facilitating greater percentage volatization of BADGE in the layer.

Figure 9:
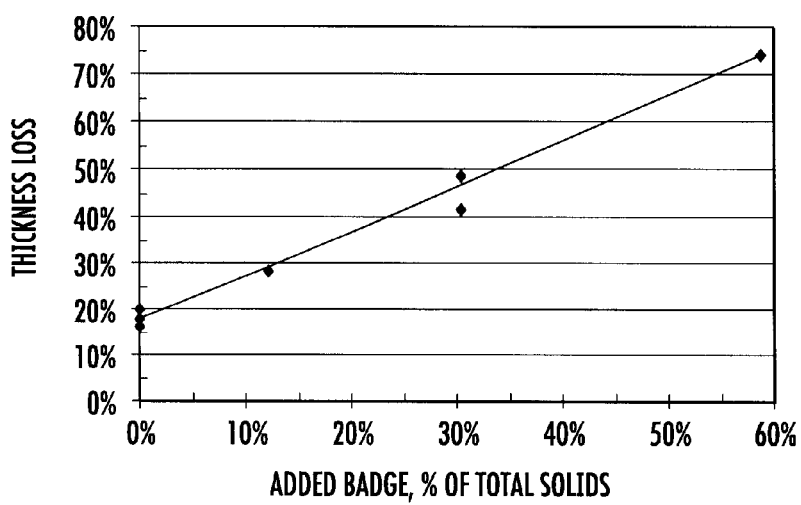
FIG. 9 is a graph illustrating a percent thickness loss of a material as a function of an added monomer according to one example embodiment.

As further shown by FIG. 9, as the percent total solids of BADGE is added to the SU8 layer, the relative percentage thickness loss from portions of the layer that have been exposed to approximately 3,000 ms of ultra-violet radiation as compared to other portions of the same layer of SU8 that remain unexposed increases. As shown by FIG. 9, the rate at which the percent thickness loss increases is a linear function of the percent of total solids of BADGE added to the SU8 material. As shown by FIG. 9, up to over 70 percent thickness loss may be achieved with the addition of BADGE in the amount of approximately 60 percent of the total solids (excluding solvents) of the SU8 layer.

Thus, as shown by FIG. 9, by adding BADGE or other monomers to the negative resist polymer, such as SU8, percent thickness losses may be increased to enhance height differences between levels of a multi-level layer such as layer 40 shown in FIG. 4. In other embodiments, in lieu of adding a VRM, such as BADGE to a commercially available photo polymer such as SU8, materials having appropriate concentrations of VRMs, such as monomers such as BADGE, may be directly formed or synthesized to provide a volatile polymer that has varying degrees of volatization upon being heated to provide distinct thicknesses or levels.

Figure 10:
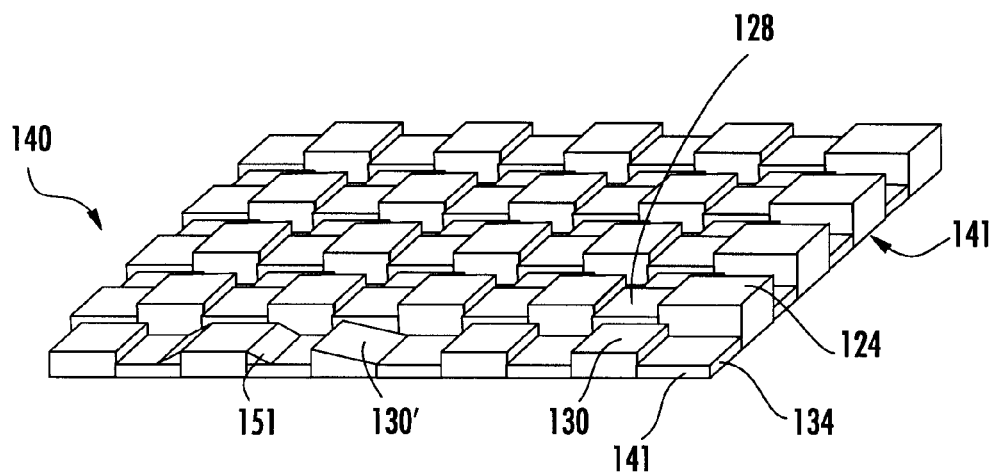
FIG. 10 is a top perspective view of a multi-level layer according to one example embodiment.
Figure 11:
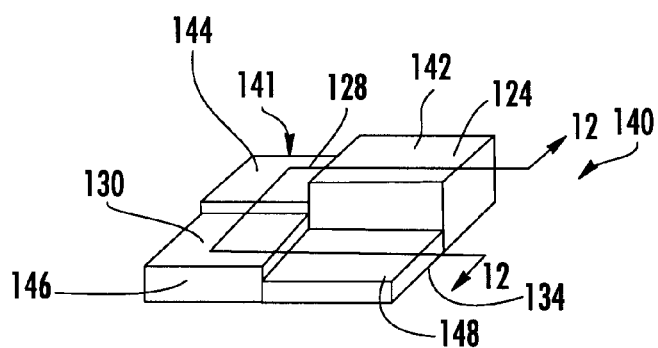
FIG. 11 is a top perspective view of one set of portions of the multi-level layer of FIG. 10 according to an example embodiment.

FIGS. 10 and 11 illustrate multi-level layer 140, another embodiment of multi-level layer 40 shown in FIG. 4. As shown by FIG. 10, layer 140 includes a repeating pattern of groupings or sets 141 of multiple distinct portions 124, 128, 130 and 134. As shown by FIG. 11 which illustrates a single set 141, portions 124, 128, 130 and 134 have distinct thicknesses which results in each of such portions having distinct levels. In particular, portions 124, 128, 130 and 134 include distinct levels 142, 144, 146 and 148, respectively. In the example illustrated, each portion 124, 128, 130 and 134 has a specific amount of a cross-linking agent, wherein each portion 124, 128 to 130 and 134 has a distinct thickness for the specified amount of the cross-linking agent. Each of portions 124, 128, 130 and 134 also has a distinct remaining concentration and molecular weight distribution of a VRM such as BADGE.

Portions 124, 128, 130 and 134 of each set 141 of layer 140 are formed according to one of the methods illustrated and described with respect to FIGS. 1-4, 5A, 5B or 7. As a result, layer 140 is formed utilizing a single coating process (FIG. 1). Because such thickness variations are achieved based on different levels of cross-linking and volatizing materials from layer 140, developing processes, etching processes and stripping processes may be omitted. In addition, layer 140 may be formed from a process that utilizes minimal consumables and may result in minimal process waste disposal. Utilizing gray-scale masks, such as mask 56 shown in FIG. 5A, highly repeatable analog changes in thickness may be achieved. In addition, gradual sloped or ramped transitions 151 (shown in FIG. 10) between one or more of portions 124, 128, 130 and 134 may be formed. In particular embodiments, one or more of portions 124, 128, 130 and 134 may themselves be at least substantially ramped, sloped or tapered as shown by ramped portion 130' or 151 (shown in FIG. 10).

In the particular example illustrated, layer 140 includes a photo polymer that generates a photo acid in response to being exposed to radiation, such as ultra-violet radiation. In one embodiment, layer 140 includes a negative photoresist polymer. Layer 140 cross-links in response to being heated. During such heating, one or more volatile reactive molecules are released, volatizing or sublimed from the material, resulting in layer 140 further exhibiting in loss of thickness. The degree to which the VRMs are released, volatized or sublimed from the remainder of layer 140 may vary depending upon the degree to which the one or more VRMs are bound in the polymer matrix as a result of the level or degree of cross-linking. In one embodiment, layer 140 may include a volatile reactive molecule such as a monomer. In one embodiment, layer 140 constitutes a layer of a bisphenol-A novolac epoxy resin such as a fully epoxidized bisphenol-A/formaldehyde novolac co-polymer combined with an appropriate photo acid generator (one example of which is sometimes referred to as SU8).

In the example illustrated, levels 142, 144, 146 and 148 are formed by applying distinct doses of ultraviolet radiation to each of portions 124, 128, 130 and 134, respectively, prior to the applying heat to layer 140. In one example embodiment, portioning 134 is exposed to an ultraviolet radiation dose of about 200 mJ/cm2. Portion 130 is exposed to an ultraviolet radiation dose of about 250 mJ/cm2 which results in level 146, at its center, extending at a height of about 71 nm above level 148 of portion 134. Portion 128 is exposed to an ultraviolet radiation dose of about 350 mJ/cm2 which results in level 144, at its center, extending at a height of about 194 nm above level 148 of portion 134. Portion 124 is exposed to an ultraviolet radiation dose of about 550 mJ/cm$^2$ which results in level 142 extending at a height, at its center, of about 315 nm above level 148 of portion 134. In another embodiment, portions 124, 128, 130 and 134 are exposed to appropriate levels of ultraviolet radiation such that levels 142, 144, 146 and 148 have height variations of at least 100 nm between each level. In yet other embodiments, portions 124, 128, 130 and 134 may be exposed to other levels or doses of ultraviolet radiation such that levels 142, 144, 146 and 148 have other relative heights.

In further embodiments, an optional post expose bake then develop step can be inserted immediately after exposure to substantially remove portions that have been completely masked out and therefore had no exposure. Subsequently, all portions can then be heated to define the height variation that have been previously described.

Figure 12:
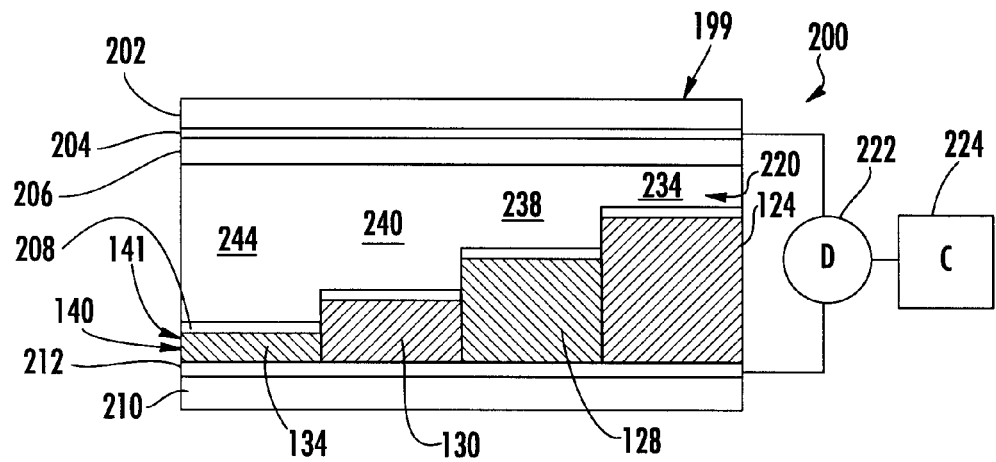
FIG. 12 is a sectional view of a display pixel according to an example embodiment.

FIGS. 12-16 schematically illustrate various embodiments including multi-level layer 140. In particular, FIGS. 12-16 are sectional views of individual display pixels including one set 141 of multilevel layer 140 taken along line 12-12 of FIG. 11. FIG. 12 illustrates a pixel 199 of a display 200. Although layer 140 is illustrated as including a single set 141 of portions 124, 128, 130 and 134, display 200 includes a layer 140 having a repeating pattern of such sets 141 as shown in FIG. 10. In other embodiments, display 200 may alternatively include a layer 140 having a single set of portions 124, 128, 130 and 148. In yet other embodiments, each set 141 may alternatively include greater or fewer than four portions. In addition to multilevel layer 140, display 200 further includes front substrate 202, electrode 204, alignment layers 206, 208, substrate 210, electrode 212, active layer 220, voltage driver 222 and controller 224.

Substrate 202 comprises one or more layers of one or more materials serving as a base or foundation upon which electrode 204 and alignment layer 206 are formed. Front substrate 202 is formed from an optically transparent and clear dielectric material. In one embodiment, front substrate 202 may be formed from an optically clear and flexible dielectric material that is birefringence free such as polyethersulfone (PES). In other embodiments, that omit a polarizer, transparent films or materials having birefringence such as polyethyleneterephthalate (PET) may be employed. In other embodiments, front substrate 202 may be formed from other transparent dielectric materials that may be inflexible such as glass.

Electrode 204 constitutes a layer of transparent or translucent electrically conductive material formed upon substrate 202. Electrode 204 is configured to be charged to cooperate with electrode 212 to create an electric field across active layer 220. In one embodiment, electrode 204 may constitute a transparent conductor such as indium tin oxide (ITO) or a conductive transparent polymer such as Polyethylenedioxythiophene polystyrenesulfonate: (PEDOT:PSS) which is commercially available from HC Starck. In other embodiments the transparent conductive coating may comprise other materials such as carbon nanotubes, zinc oxide, tin oxide, zinc tin oxide, copper indium oxide, strontium copper oxide, cadmium oxide and thin layers of metals such as Al, Pt, Ag, Au, Cu. In other embodiments, electrode 204 may be formed from other translucent or transparent electrically conductive materials.

Alignment layer 206 comprises a layer of material upon electrode 204 and in contact with active layer 220. Similarly, alignment layer 208 comprises a layer of material overlying layer 140 and in contact with active layer 220. Alignment layers 206 and 208 cooperate to align liquid crystals of active layer 220. For example, in those embodiments in which active layer 220 includes twisted nematic liquid crystals, layers 206 and 208 cooperate to align such liquid crystals in an appropriate orientation. In one embodiment, layer 206 may comprise a rubbed polyimide having parallel microscopic grooves in a first direction while layer 208 comprises a rubbed polyimide having parallel microscopic grooves in a second direction orthogonal to the first direction. In other embodiments, layers 206 and 208 may have other configurations for aligning liquid crystals of active layer 220. In yet another embodiment, the alignment layer may be composed of microstructures, such as posts or grooves. In particular embodiments, layers 206 and 208 may be omitted where alignment of crystals of active layer 220 may be omitted. For example, alignment layers 206 and 208 may be omitted in those embodiments in which active layer 220 comprises polymer dispersed liquid crystal or the active layer is composed of materials other than liquid crystals displays that requires polarizers or any active layer materials which effect an optical response.

Substrate 210 comprises one or more layers of one or more materials configured to support electrode 212 and layer 140. In embodiments where display 200 is a transmissive or backlit display, substrate 210 is formed from one or more optically clear or transparent materials. In one embodiment, substrate 210 may be formed from an optically clear and flexible dielectric material that is birefringence free such as polyethersulfone (PES). In other embodiments, that omit a polarizer, transparent films or materials having birefringence such as polyethyleneterephthalate (PET) may be employed. In other embodiments, substrate 210 may be formed from other transparent dielectric materials that may be inflexible such as glass. In another embodiment where display 200 is a front lit display, substrate 210 may be formed from one or more rigid opaque dielectric materials.

Electrode 212 is similar to electrode 204. Electrode 212 is configured to be charged to cooperate with electrode 204 to create an electric field across active layer 220. In embodiments in which display 200 comprises a backlit display, electrode 212 is formed from one or more optically clear or transparent electrically conductive materials such as ITO or PEDOT:PSS. In other embodiments the transparent conductive coating may comprise other materials such as carbon nanotubes, zinc oxide, tin oxide, zinc tin oxide, copper indium oxide, strontium copper oxide, cadmium oxide and thin layers of metals such as Al, Pt, Ag, Au, Cu. In embodiments where display 200 is a front lit display, electrode 212 may be formed from one or more transparent electrically conductive materials or opaque electrically conductive materials. In such an embodiment, electrode 212 may be formed from an electrically conductive material that is also highly reflective.

Active layer 220 comprises a layer of any electro-optically responsive material configured with alignment layers 206, 208 to change its optical behaviour in response to an applied electric field. In one embodiment, the retardation of polarised light is modified such that when viewed through a suitably aligned polarising film, the display pixel can modulate the intensity of transmitted or reflected light. In other embodiments, active layer 220 may contain re-orientable dichroic dye molecules or pigments such that transmitted or reflected light is modulated without the need for external polarizing elements. In further embodiments, active layer 220 may modulate the scattering of incident light by means of polymer dispersed liquid crystals. In yet further embodiments, active layer 220 may modulate the spectral content (i.e. color) of incident light. In still other embodiments, layer 220 may comprise other presently developed or future developed materials configured to selectively block, absorb or attenuate light In one embodiment the electro-optical effect or state of layer 220 has a optical threshold, and in a further example embodiment, the electro-optical effect of layer 220 has state memory (i.e. bistability) with a distinct threshold field level. By this means, when a voltage is applied between electrodes 204, 212, areas of the pixel which receive a field strength higher than the memory threshold will change state, whereas areas which receive a lower field will not. By design of the areas and thickness of the structures 140, spatial greytone may be generated. This is particularly beneficial to electro-optical effects or states which have a distinct optical threshold such as, but not limited to, ferroelectric liquid crystal, bistable nematic liquid crystal, cholesteric texture liquid crystal, viologen based electro-chromic, MEMS or micro-fluidic devices.

Active layer 220 extends between electrodes 204 and 212. Active layer 220 includes regions 234, 238, 240 and 244. Regions 234, 238, 240 and 244 extend opposite to portions 124, 128, 130 and 134 of layer 140, respectively. Because layer 140 is a dielectric material and because portions 124, 128, 130 and 134 have differing thicknesses, regions 234-244 experience different electric fields having different strengths even though a common voltage is created between electrodes 204 and 212. As a result, regions 234-244 will change between different electro-optical effects including but not limited to different light attenuating states or different wavelength absorbing states at different times or in response to different voltages created between electrodes 204 and 212.

For example, because portion 134 has the smallest thickness, region 244 experiences the strongest electrical field for a given voltage between electrodes 204 and 212. As a result, region 244 will change between different electro-optical effects or states at a lower voltage between electrodes 204, 212 as compared to regions 234-240. Similarly, region 240 will change at a lower voltage as compared to regions 238 and 234 and region 238 will change at a lower voltage as compared to region 234. Thus, the multiple distinct thicknesses of layer 140 enable distinct regions of active layer 220 and the associated pixel of display 200 to be selectively actuated between different electro-optical states based upon the voltage applied across electrodes 204 and 212 by both driver 222 and controller 224. The selective actuation of regions 234-244 may be achieved without electrical switching elements provided for each of regions 234-244, reducing the cost and complexity of display 200.

Voltage driver 222 comprises one or more devices or structures configured to selectively apply voltages across the electrodes 204 and 212 to control an electric field created across active layer 220. In one embodiment, driver 222 may comprise one or more voltage sources and one or more electrical switching elements, such as transistors, metal-insulatormetal devices, diodes and the like. Such electrical switching elements may be arranged as part of an active-matrix control, wherein the electrical switching elements are proximate each of the pixels or sets 141 or a passive control, wherein the electrical switching elements are grouped together distant the pixels or sets 141.

Controller 224 comprises a processing unit configured to generate control signals based upon desired images to be displayed by display 200, wherein driver 222, in response to such control signals, creates appropriate voltages between electrodes 204 and 212 and across active layer 220. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 224 is not limited to any specific combination of hardware circuitry and software, nor to any particular source for the instructions executed by the processing unit.

In operation, controller 224 generates control signals based upon an image to be displayed by display 200. In response to such control signals, driver 222 establishes a desired voltage across electrodes 204 and 212 to selectively control how many of regions 234, 238, 240 and 244 of one or more sets 141 are actuated between different light attenuating or absorbing states. For example, for a particular pixel of display 200 having a particular set 141 of portions of layer 140, a first voltage may be applied across electrodes 204 and 212 to actuate region 244 while regions 234, 238 and 240 remain unactuated. To additionally actuate region 240 of active layer 220, a larger voltage may be applied across electrodes 204 and 212. Likewise, even larger voltages may be applied across electrodes 204 and 212 to additionally selectively actuate regions 238 and 234.

Figure 13:
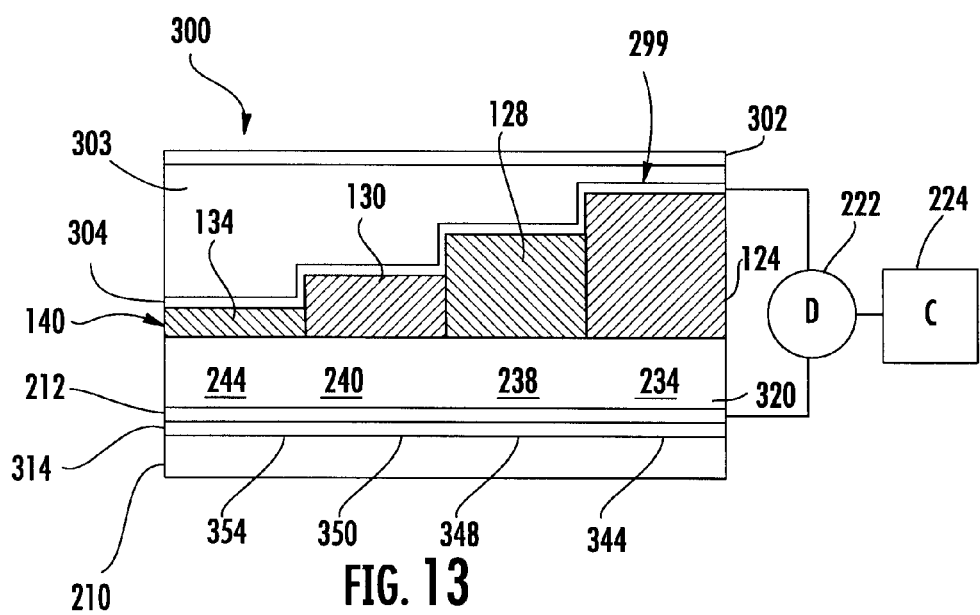
FIG. 13 in a sectional view of another embodiment of a display pixel according to an example embodiment.

FIG. 13 schematically illustrates a single pixel 299 of display 300, another embodiment of display 200. Pixel 299 is similar to pixel 199 except that pixel 299 includes substrate 302, adhesive 303, electrode 304 and active layer 320 in lieu of substrate 202, electrode 204 and active layer 220, respectively, omits alignment layers 206, 208 and additionally includes light altering layer 314. Those remaining elements of pixel 299 and display 300 which correspond to pixel 199 and display 200 are numbered similarly.

Substrate 302 is similar to substrate 202 except that substrate 302 supports layer 140 and electrode 304 which are joined to substrate by adhesive layer 303. Like substrate 202, substrate 302 is formed from one or more layers of one or more optically clear or transparent dielectric materials. In one embodiment, substrate 302 may comprise an optically clear and flexible dielectric material that is birefringence free such as polyethersulfone (PES). In other embodiments, that omit a polarizer, transparent films or materials having birefringence such as polyethyleneterephthalate (PET) may be employed. In other embodiments, substrate 302 may be formed from other transparent dielectric materials that may be inflexible such as glass.

Adhesive layer 303 comprises a transparent adhesive. In one embodiment, the adhesive may comprise a UV-curable material such as NOA81 (Norland Optical Products), but alternatively may be thermal or moisture cured.

Electrode 304 is similar to electrode 204 except that electrode 304 is stepped as it extends over portions 124, 128, 130 and 134 of layer 140. Like electrode 204, electrode 304 is formed from an optically clear or transparent electrically conductive material. In one embodiment, electrode 304 may comprise a transparent conductor such as ITO or PEDOT:PSS. In other embodiments the transparent conductive coating may comprise other materials such as carbon nanotubes, zinc oxide, tin oxide, zinc tin oxide, copper indium oxide, strontium copper oxide, cadmium oxide and thin layers of metals such as Al, Pt, Ag, Au, Cu. In other embodiments, electrode 304 may be formed from other translucent or transparent electrically conductive materials.

Active layer 320 comprises a layer of optical charge responsive material configured to change from a transparent state, allowing light to pass through active layer 320, to a generally opaque state in which light is absorbed or otherwise attenuated by layer 320 in response to changes in an applied voltage or charge. In the particular example illustrated, active layer 320 comprises a polymer-dispersed liquid crystal, permitting alignment layers 206, 208 (shown in FIG. 12) to be omitted. In other embodiments, active layer 320 may comprise other optical charge responsive materials. For example, active layer 320 may comprise a nematic liquid crystal, wherein display 300 additionally includes alignment layers 206 and 208 (shown in FIG. 12). Like layer 220, layer 320 includes regions 234, 238, 240 and 244 generally opposite to portions 124, 128, 130 and 134 of layer 140. As a result of the different thicknesses of portions 124, 128, 130 and 134 spacing electrode 304 from active layer 320, regions 234, 238, 240 and 244 actuate or change between different light attenuating states in response to different applied voltages created between electrodes 304 and 212.

Light altering layer 314 comprises one or more layers of one or more materials configured to alter or change light prior to or after the transition of light across active layer 320. In one embodiment in which display 300 comprises a backlit display, layer 314 may comprise a light filtering layer configured to filter selected wavelengths of light. In such an embodiment, layer 314 may include distinct portions 344, 348, 350 and 354 opposite to regions 234, 238, 240 and 244, respectively. Each portion 344-354 may be configured to filter a different range of wavelengths of light. For example, region 344 may filter red light, 348 may filter blue light, region 350 may filter green light and region 354 may block or reflect all light or filter other wavelengths of light. In other embodiments in which displays 300 comprises a front lit display, layer 314 may be configured to reflect selected wavelengths of light or may be configured to reflect substantially all wavelengths of light. In one embodiment, portions 344-354 of layer 314 may each be configured to reflect different ranges of wavelengths of light. In yet other embodiments, layer 314 may be configured to filter or reflect a single color of light, wherein adjacent pixels have layers 314 that filter or reflect other colors of light. For example, in one embodiment, layer 314 may filter (in the case of a backlit display) or reflect (in the case of a front lit display) red light. Adjacent pixels may have layers 314 that filter or reflect green light or blue light. In some embodiments, portions 344-354 may alternatively be configured to reflect the same wavelengths of light. For example, in another embodiment, substantially all of layer 314 may be white. In yet other embodiments, layer 314 may be omitted.

Figure 14:
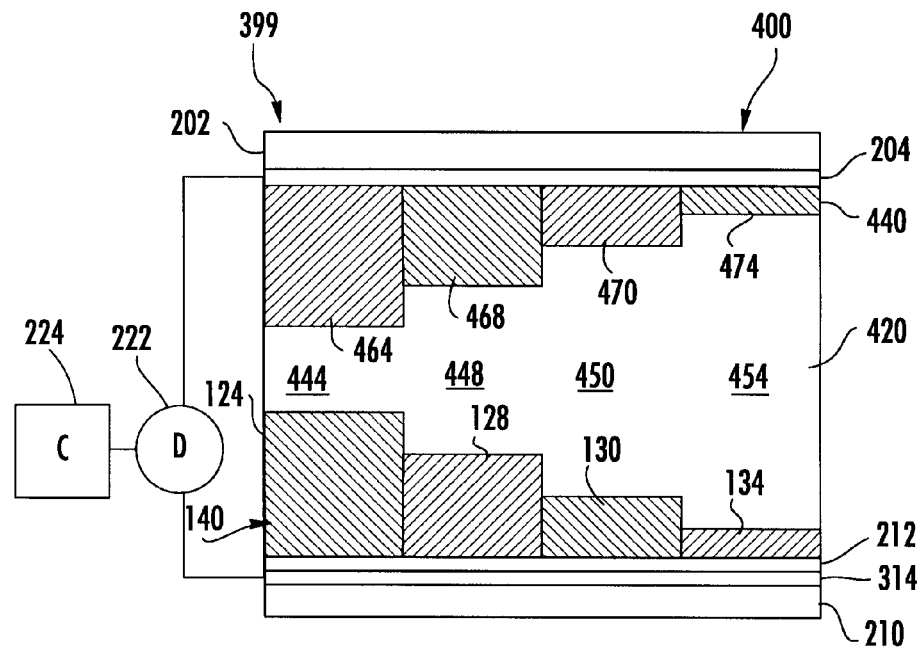
FIG. 14 is a sectional view of another embodiment of a display pixel according to an example embodiment.

FIG. 14 schematically illustrates one pixel 399 of display 400, another embodiment of display 200. Display 400 is similar to display 200 (shown in FIG. 12) except that display 400 omits alignment layers 206, 208, includes active layer 420 in lieu of active layer 220 and additionally includes layer 440 and light altering layer 314 (described above with respect to FIG. 13). Those remaining elements of display 400 which correspond to elements of display 200 are numbered similarly. Active layer 420 is similar to active layer 320 of display 300 (shown and described with respect to FIG. 13). In the example illustrated, active layer 420 comprises a polymer-dispersed liquid crystal, permitting alignment layers 206 and 208 to be omitted. In other embodiments, active layer 420 may comprise other materials configured to change between different light attenuating or light absorbing states in response to different electric fields. For example, in other embodiments, active layer 420 may comprise other liquid crystals. In those environments in which active layer 420 includes liquid crystals that should be aligned, such as twisted nematic crystals, display 400 may additionally include alignment layers 206, 208 as described above with respect to FIG. 12.

Active layer 420 includes regions 444, 448, 450 and 454. Regions 444, 448, 450 and 454 experience different electrical fields as a result of layers 140 and 440. Consequently, regions 444, 448, 450 and 454 change between different light attenuating or light absorbing states at different times in response to different voltages applied across electrodes 204 and 212.

Layer 440 is substantially similar to layer 140. Layer 440 is supported by substrate 202 and extends between electrode 204 and active layer 420. Layer 440 is formed according to one of the methods described above with respect to FIGS. 1-4, 5A, 5B or FIG. 7. As shown by FIG. 14, layer 440 includes distinct portions 464, 468, 470 and 474 which have different thicknesses and which extend opposite to portions 124, 128, 130 and 134 of layer 140, respectively.

Like layer 140, layer 440 controls the strength of the electrical field experienced by active layer 420 even though a common voltage is created between electrodes 204 and 212. As a result, regions 444-454 will change between different light attenuating states or wavelength absorbing states at different times or in response to different voltages created between electrodes 204 and 212. For example, because portion 474 has the smallest thickness, region 454 experiences the strongest electrical field for a given voltage between electrodes 204 and 212. As a result, region 454 will change between different light attenuating or absorbing states at a lower voltage between electrodes 204, 212 as compared to regions 444-450. Similarly, region 450 will change at a lower voltage as compared to regions 444 and 448 and region 448 will change at a lower voltage as compared to region 444. Thus, the multiple distinct thicknesses of layer 440 enable distinct regions of active layer 420 and the associated pixel of display 400 to be selectively actuated between different light absorbing or light attenuating states based upon the voltage applied across electrodes 204 and 212 by both driver 222 and controller 224. Because display 400 includes both layers 140 and 440, greater electrical field variations between electrodes 204 and 212 may be achieved, permitting selective actuation of regions 444-454 with less costly and less precise voltage control. In addition, the greater electric field variations facilitate the addition of more selectively actuatable regions of active layer 420. The selective actuation of regions 444-454 may be achieved without electrical switching elements provided for each of regions 444-454, reducing the cost and complexity of display 400.

Figure 15:
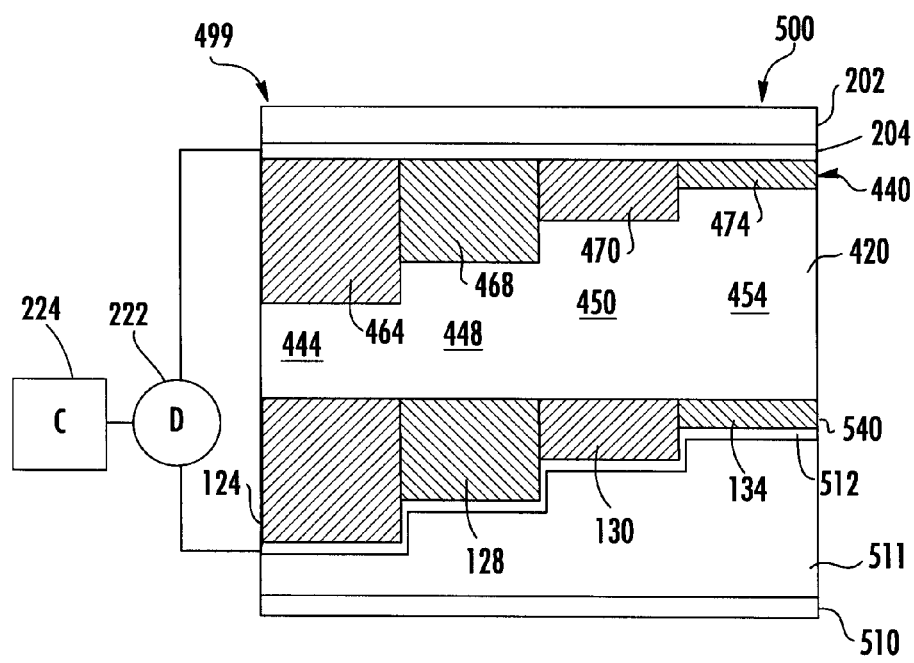
FIG. 15 is a sectional view of another embodiment of a display pixel according to an example embodiment.

FIG. 15 schematically illustrates an individual pixel 499 of display 500, another embodiment of display 200. Display 500 is substantially similar to display 400 except that display 500 includes substrate 510, adhesive layer 511, electrode 512 and multi-level layer 540 in lieu of substrate 210, electrode 212 and layer 140, respectively. Those remaining elements of display 500 which correspond to elements of display 400 are numbered similarly. Like substrate 210, substrate 510 is formed from one or more layers of one or more optically clear or transparent dielectric materials. In one embodiment, substrate 510 may be formed from an optically clear and flexible dielectric material that is birefringence free such as polyethersulfone (PES). In other embodiments, that omit a polarizer, transparent films or materials having birefringence such as polyethyleneterephthalate (PET) may be employed. In other embodiments, substrate 510 may be formed from other transparent dielectric materials that may be inflexible such as glass. In yet other embodiments in which display 500 is a front-lit display, substrate 510 may be formed from an opaque or reflective dielectric material.

Adhesive layer 511 connects and spaces electrode 512 and substrate 510. Adhesive layer 511 comprises a transparent adhesive. In one embodiment, the adhesive may comprise a UV-curable material such as NOA81 (Norland Optical Products), but alternatively may be thermal or moisture cured.

Electrode 512 is similar to electrode 212 except that electrode 512 is stepped as it extends over portions 124, 128, 130 and 134 of layer 140. Like electrode 212, electrode 512 is formed from an optically clear or transparent a likely conductive material. In one embodiment, electrode 512 may constitute a transparent conductor such as ITO or PEDOT:PSS. In other embodiments the transparent conductive coating may comprise other materials such as carbon nanotubes, zinc oxide, tin oxide, zinc tin oxide, copper indium oxide, strontium copper oxide, cadmium oxide and thin layers of metals such as Al, Pt, Ag, Au, Cu. In other embodiments, electrode 512 may be formed from other translucent or transparent electrically conductive materials. In still other embodiments in which display 500 comprises a front-lit display, electrode 512 may be formed from reflective or opaque electrically conductive materials.

Layer 540 is substantially identical to layer 140 except that layer 540 is inverted. Layer 540 includes portions 124, 128, 130 and 134 which extend opposite to portions 464, 468, 470 and 474 of layer 440. The differing thicknesses of portions 124, 128, 130 and 134 result in active layer 420 experiencing different electric field strengths for a single given voltage between electrode 204 and electrode 512. As a result, regions 444-454 of active layer 420 may be selectively actuated between states by controlling the voltage across electrodes 204 and 512.

Figure 16:
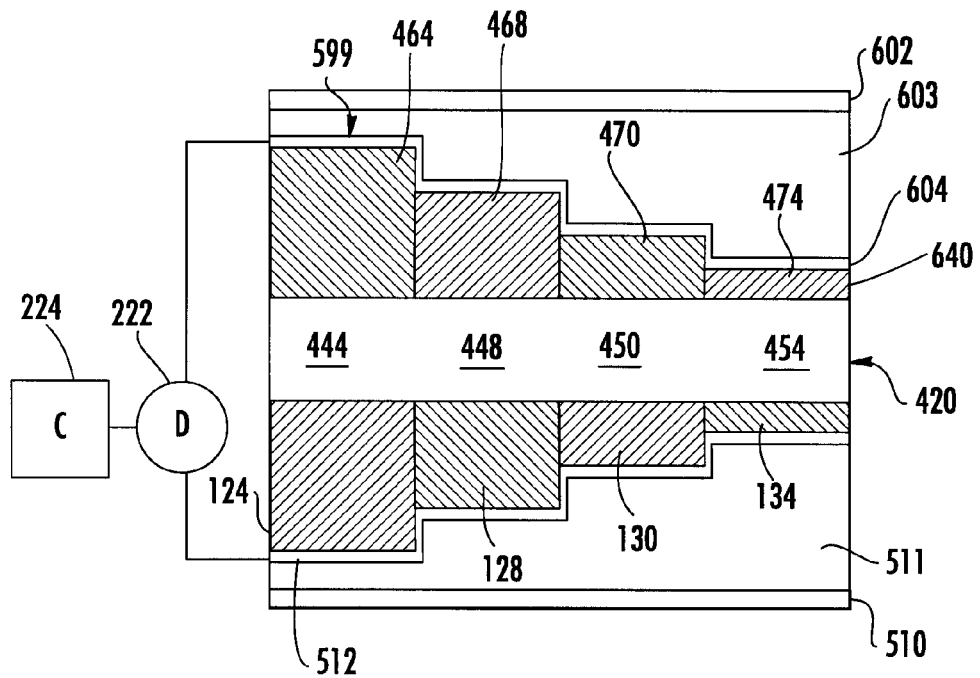
FIG. 16 is a sectional view of another embodiment of a display pixel according to an example embodiment.

FIG. 16 schematically illustrates pixel 599 of display 600, another embodiment of display 200 (shown and described with respect to FIG. 12). Display 600 is substantially similar to display 500 of FIG. 15 except that display 600 includes substrate 602, adhesive layer 603, electrode 604 and multi-level layer 640 in lieu of substrate 202, electrode 204 and layer 440, respectively. Those remaining elements of display 600 which correspond to elements of display 500 are numbered similarly. Like substrate 202, substrate 602 is formed from one or more layers of one or more optically clear or transparent dielectric materials. In one embodiment, substrate 602 may be formed from an optically clear and flexible dielectric material that is birefringence free such as polyethersulfone (PES). In other embodiments, that omit a polarizer, transparent films or materials having birefringence such as polyethyleneterephthalate (PET) may be employed. In other embodiments, substrate 602 may be formed from other transparent dielectric materials that may be inflexible such as glass.

Adhesive layer 603 connects and spaces electrode 604 and substrate 602. Adhesive layer 603 comprises a transparent adhesive. In one embodiment, the adhesive may comprise a UV-curable material such as NOA81 (Norland Optical Products), but alternatively may be thermal or moisture cured.

Electrode 604 is similar to electrode 204 except that electrode 604 is stepped as it extends over portions 464, 468, 470 and 474 of layer 640. Like electrode 204, electrode 604 is formed from an optically clear or transparent a likely conductive material. In one embodiment, electrode 604 may constitute a transparent conductor such as ITO or PEDOT:PSS. In other embodiments the transparent conductive coating may comprise other materials such as zinc oxide, tin oxide, zinc tin oxide, copper indium oxide, strontium copper oxide, cadmium oxide, carbon nanotubes and thin layers of metals such as Al, Pt, Ag, Au, Cu. In other embodiments, electrode 604 may be formed from other translucent or transparent electrically conductive materials Layer 640 is substantially identical to layer 440 except that layer 640 is inverted. Layer 640 includes portions 464, 468, 470 and 474 which extend opposite to portions 124, 128, 130 and 134 of layer 540. The differing thicknesses of portions 464, 468, 470 and 474 result in active layer 420 experiencing different electric field strengths for a single given voltage between electrode 604 and electrode 512. As a result, regions 444-454 of active layer 420 may be selectively actuated between states by controlling the voltage across electrodes 604 and 512. In addition, because layer 420 has a substantially uniform thickness over the area of all the pixels 600, improved performance and manufacturing efficiencies may result.

Figure 17:
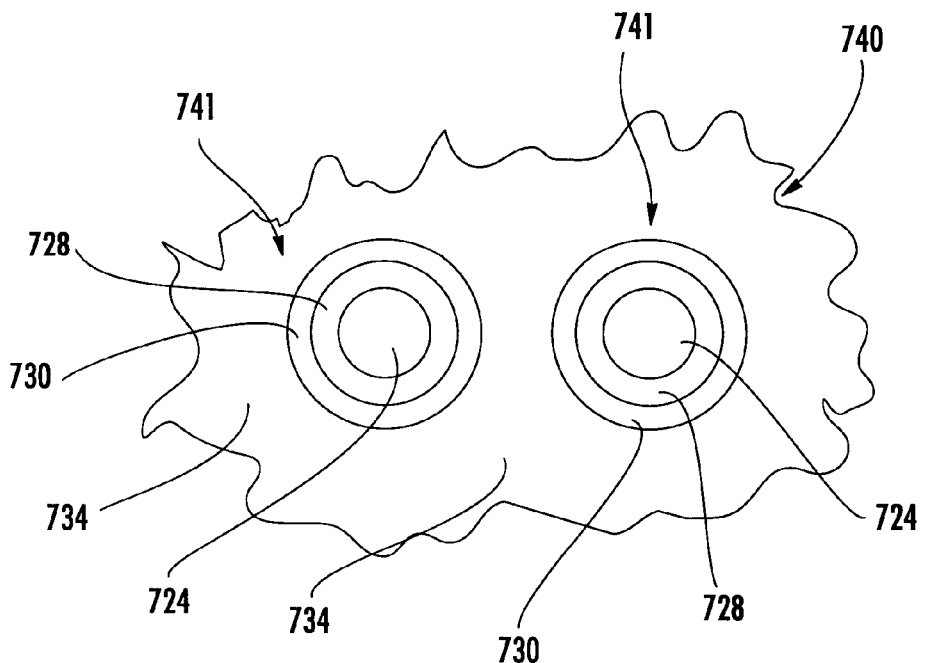
FIG. 17 is a top plan view of another embodiment of the multi-level layer of FIG. 10 according to an example embodiment.
Figure 18:
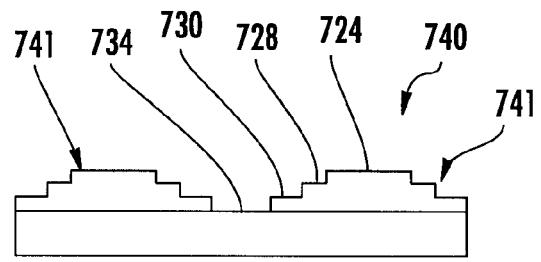
FIG. 18 is a sectional view of the multi-level layer of FIG. 17 according to an example embodiment.

FIGS. 17 and 18 illustrate multi-level layer 740, another embodiment of multi-level layer 140. Multi-level layer 740 is similar to layer 140 except that layer 140 includes a repeating pattern of sets 741 of portions 724, 728, 730 and 734. Portion 724, 728, 730 and 734 are similar to portions 124, 128, 130 and 134 of layer 140, respectively, except that portion 734 comprises the floor of layer 740 extending between adjacent sets 741, that portions of 724, 728 and 730 are stacked upon one another so as to extend outwardly beyond one another and that portions 724, 728 and 730 are circular.

Like portions 124, 128 and 130 and 134, portion 724, 724, 730 and 734 have distinct thicknesses. In particular, each portion 724, 728, 730 and 734 has a specific amount of a cross-linking agent, wherein each portion 724, 728, 730 and 734 has a distinct thickness for the specified amount of the cross-linking agent. Each of portions 724, 728, 730 and 734 also has a distinct remaining concentration and molecular weight distribution of a VRM such as BADGE.

Portions 724, 728, 730 and 734 of each set 741 of layer 740 are formed according to one of the methods illustrated and described with respect to FIGS. 1-4, 5A, 5B or 7. As a result, layer 740 is formed utilizing a single coating process (FIG. 1). Because such thickness variations are achieved based on different levels of cross-linking and volatizing materials from layer 740, developing processes, etching processes and stripping processes may be omitted.

Although portions 724, 728, 730 and 734 are illustrated as being circular, in other embodiments, portions 724, 728 and 730 may alternatively be square, rectangle or, triangular or have other shapes. Although portions 724, 728 and 730 are illustrated as having a common shape, in other embodiments, such portions may have differing shapes from one another. Although each set 741 is illustrated as having four distinct portions or levels, in other embodiments, each set 741 may include greater or fewer number of such portions.

Figure 19:
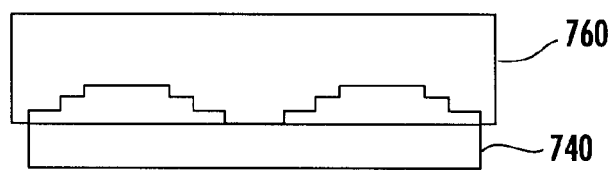
FIGS. 19-22 are sectional views schematically illustrating use of the multi-level layer of FIG. 18 to form another multi-level layer according to an example embodiment.

FIGS. 19-22 illustrate the formation of a multi-level layer 840 (shown in FIG. 22) using multi-level layer 740 (shown in FIG. 18). As shown by FIG. 19, after layer 740 is formed, a layer 760 of polymeric material is formed over layer 740. Layer 760 may comprise a UV, thermal or moisture curable material. In other embodiments, layer 760 may comprise one or more other polymeric materials.

Figure 20:
Figure 21:
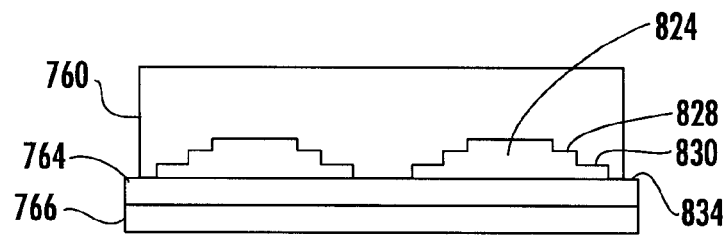
Figure 22:
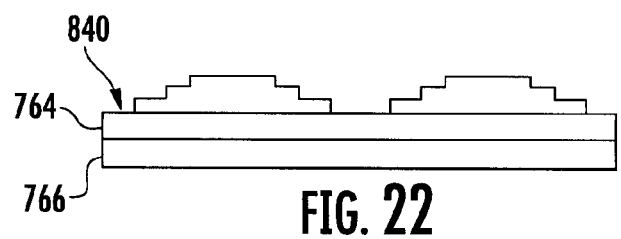

As shown by FIG. 20, upon solidification or curing of layer 760, layer 760 is separated from layer 740. As shown by FIG. 21, a layer 764 of dielectric material is formed upon a dielectric substrate 766. Thereafter, layer 760 is imprinted or embossed against layer 764 to form multi-level layer 840 upon substrate 766. As shown by FIG. 22, upon solidification or curing of the imprinted layer 764, layer 760 (shown in FIG. 21) is separated from layer 764 to produce multi-level layer 840. Multi-level layer 840 may be used in lieu of layers 140, 440 and 540 in displays 200, 300, 400 and 500 as described above. Layer 760 may also be used for forming additional multilevel layers 840. In such an embodiment, layer 764 and multilevel layer 840 may be formed from various dielectric materials.

According to one embodiment, layer 764 comprises a layer of a bisphenol-A novolac epoxy resin such as a fully epoxidized bisphenol-A/formaldehyde novolac co-polymer combined with an appropriate photo acid generator (an example of which is sometimes referred to as SU8). In such an embodiment, layer 760 is formed from one or more UV radiation transmitting materials, wherein layer 764, while imprinted by layer 760, is exposed to ultraviolet radiation passing through layer 760. In particular embodiments, layer 764 may be provided with appropriate levels of BADGE and distinct portions 824, 828, 830 and 834 of layer 764 being imprinted by layer 760 may be exposed to different doses of ultraviolet radiation through layer 760 such that portions 824-834 undergo different degrees of cross-linking and underground different degrees of volatization upon being subsequently heated so as to enlarge thickness differences between portions 824, 828, 830 and 834 of the resulting multilevel layer 840.

Figure 23A:
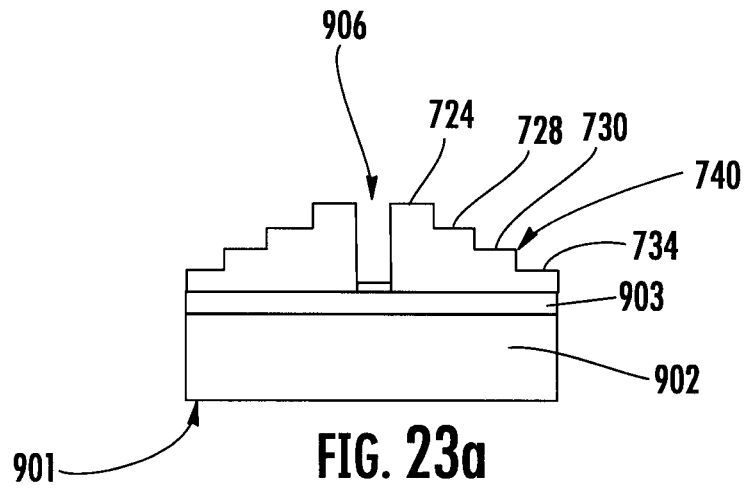
FIGS. 23a-23e illustrate stages in the manufacture of a cell wall assembly having busbars and electrode structures in a predetermined alignment according to one example embodiment.
Figure 25:
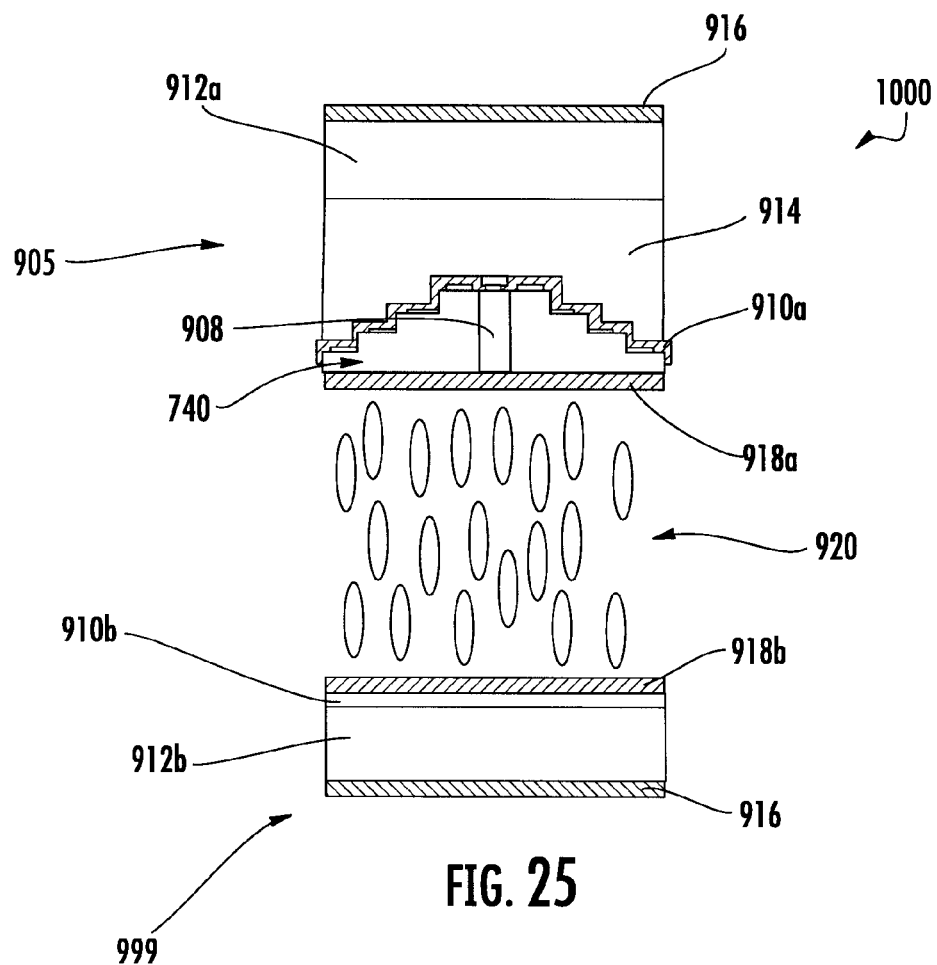
FIG. 25 is a schematic sectional view through part of a liquid crystal display device in accordance with another example embodiment.

FIGS. 23a-23e illustrate a method for forming a pixel 999 of a display 1000 (shown in FIG. 25). A transfer carrier 901 is shown in FIG. 23a. The carrier 901 comprises a base film 902 on which is coated a planar conductive layer 903. The carrier 901 may be rigid or flexible. In this example, the base film 902 comprises 150 µm thick PET and the conductive layer 903 is copper metal of about 1 µm thickness. In this example, the copper layer 903 is optically flat and has been passivated by immersion in 0.1 N potassium dichromate solution for 5 minutes, rinsed with deionised water and air-dried. Alternatively, the base film may itself be a conductor.

Figure 23B:
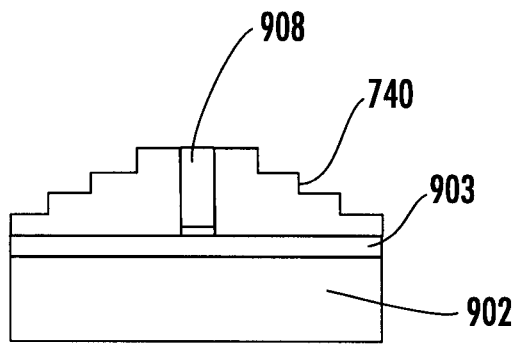

Multi-level layer 740 (described above) is formed on the surface of the conductive layer 903 A trench 906 is formed in layer 740. If necessary, the trench 906 is plasma-etched to remove polymer from the bottom of the trench 906. Metal, in this example nickel, is then electroplated into the trench 906 to form a busbar 908 (FIG. 23b). In one embodiment, the conductor 903 forms the cathode of an electrolytic cell with a nickel anode and a nickel sulphamate-based electrolyte. Plating may be carried out with DC, with pulsed or biased AC current used to fill in the trenches 906 completely. Other existing electroplating or electroless plating techniques may be employed. Suitable metals include nickel, copper and gold. The busbars 908 are linear structures which will run across the length or width of the display substrate (cell wall) to which they are transferred. They are typically about 100 µm apart and up to many metres in length. The busbars 908 are about 5×5 µm is cross-section and have a low resistance that in use will apply an applied voltage evenly across the device. The metal of the busbar 908 is opaque but it is small enough not to reduce the aperture to a large extent.

Figure 23C:
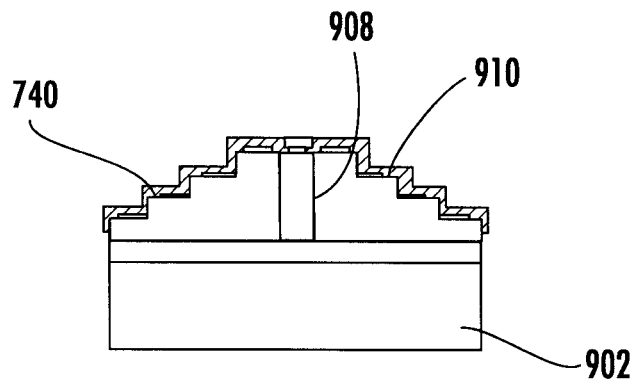

To form electrode structures, a transparent conductor 910 is deposited onto the multi-level layer 740 and busbars 908, as illustrated in FIG. 23c. The conductor 910 may comprise indium oxide, tin oxide, indium tin oxide (ITO) or the like, but is preferably an organic conductor such as PEDOT:PSS (HC Starck Baytron P), which may be applied by a printing technique such as inkjet printing. The transparent conductor is then selectively etched or bleached to provide transparent electrodes 910. Standard photolithographic techniques can be used to prevent the conductor contacting more than one busbar 908. In the preferred embodiment, PEDOT:PSS is selectively bleached by UV light to form the electrode structures. Alternatively, standard photoresists and etching or chemical deactivation may be employed.

It will be understood that, for simplicity, only a single multi-level layer 740, busbar 908 and electrode track 910 are shown. A plurality of similar dielectric structures, busbars and electrode structures will be formed, each electrode structure 910 typically comprising one of a series of parallel row or column electrodes.

Figure 23D:
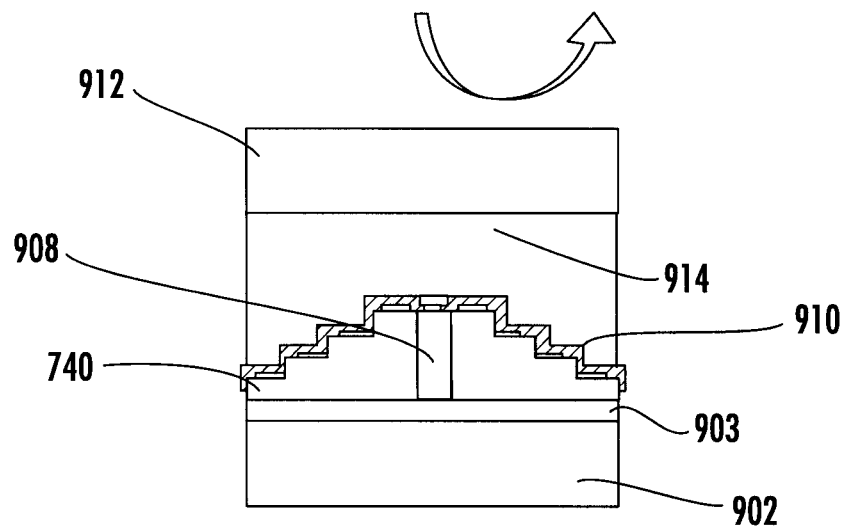

After forming the electrode structures 910, the resulting structure is treated with a transparent adhesive 914 and the final display substrate 912 is laminated and the adhesive 914 is cured (FIG. 23d). In a preferred embodiment the adhesive 914 is a UV-curable material such as NOA81 (Norland Optical Products) but may be thermal- or moisture-cured. The display substrate 912 is preferably a plastics material, for example, ZF-16 by Zeon Chemical, PEN (DuPont Teijin Teonex Q65), PES (Sumitomo Bakelite) or polyArylate (Ferrania SpA—Arylite), but could comprise glass, preferably a UV-translucent glass.

The adhesions in the assembly shown in FIG. 23d are tuned such that when the transfer carrier 901 is peeled off, the adhesion breaks at the surface of the conducting carrier substrate 903. The whole of the rest of the structure remains adhered to the display substrate 912, as illustrated in the cell wall assembly 905 of FIG. 23e. This surface is flat so that the resulting LC layer will be a constant thickness. The electrode structures 910, however, are embedded at different distances from the cell wall 912. The distances are set by the heights or thicknesses of portions 724, 728, 730 and 734 of layer 740 (now a dielectric covering layer for the electrode structures 910).

Figure 24:
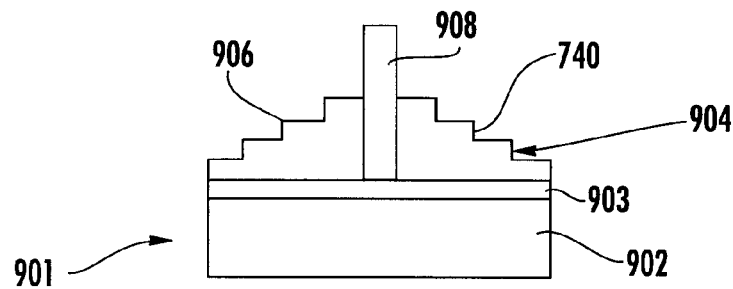
FIG. 24 illustrates a stage in the manufacture of a cell wall assembly in accordance with another example embodiment.

In this embodiment, one of the layer 740 is the full thickness of the busbar 908. It may be desirable to make the steps less than the full thickness of the busbar 908 to avoid increasing the switching threshold too much. The width of the step could be kept small to minimise the non-switching region. Alternatively, the initial trench 906 may be made somewhat shallower and the metal may be overplated to form a busbar 908 that extends beyond the dielectric structures 904 as illustrated in FIG. 24.

Figure 23E:
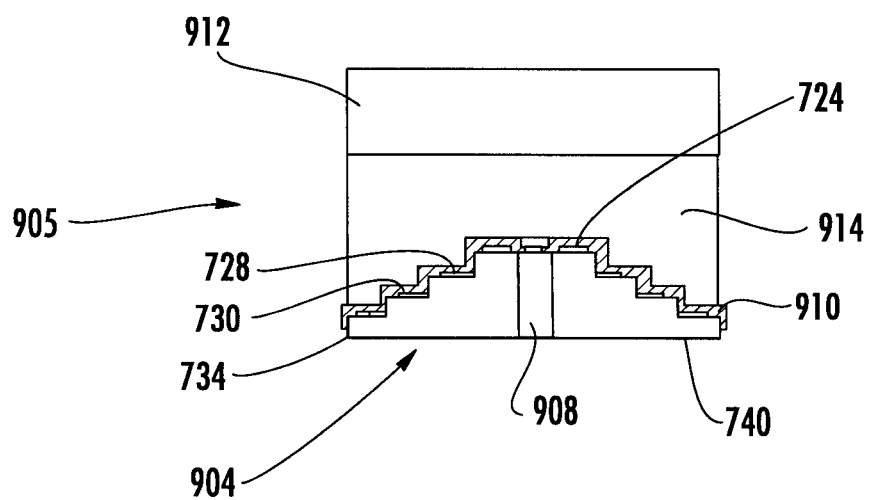

FIG. 25 illustrates a display device 1000 having a pixel 999 with greyscale capability Pixel 999 comprises the cell wall assembly 905 of FIG. 23e, including a first cell wall 912a and first electrode structures 910a, formed as previously described and in ohmic contact with the busbar 908. The pixel 999 in this example is a liquid crystal display device and has a layer of electro-optic material 920 which comprises a nematic LC. A first surface alignment 918a is provided on the innermost surface of the cell wall assembly 905. The surface alignment 918a in this example comprises a PABN surface textured with posts to provide bistable alignment to adjacent molecules of the nematic LC material 920. Other bistable alignments could be used, or conventional alignment materials such as rubbed polyimide if the display is monostable, for example a supertwist or HAN cell.

A second cell wall 912b is of conventional construction, being formed from a flat glass or plastics material and having second electrode structures 910b formed thereon by a conventional etch technique using ITO. A second surface alignment 918b is provided on the second electrode structures 910b, in this example inducing homeotropic alignment in adjacent LC molecules. Means for distinguishing between different optical states are provided, in this example polarisers 916 which are adhered to the outer surfaces of the cell walls 912. It will be understood that surface alignments 918 could be transposed; ie the PABN surface alignment could be provided on the innermost surface of the second cell wall and the homeotropic surface alignment could be provided on the first cell wall assembly 905. The second cell wall 912b may be spaced apart from the first cell wall assembly 905 by conventional spacing means (not shown) for example microbeads or pieces of glass fibre or polymer fibre. Suitable spacing means are well known to those skilled in the art of LCD manufacture.

The inner surfaces of both cell walls 912 are substantially planar and parallel to each other, and the layer of nematic LC material 920 is of substantially constant thickness. The shortest distance between the LC material 920 and one of the first electrode structures 910a varies within the area of the pixel illustrated in FIG. 25. Above a maximum threshold voltage all of the visible pixel area is in an 'on' state. For a bistable display, when the voltage is reduced or removed the pixel remains in the 'on' state. To switch the pixel to an 'off' state, a suitable pulse is applied.

Figure 26:
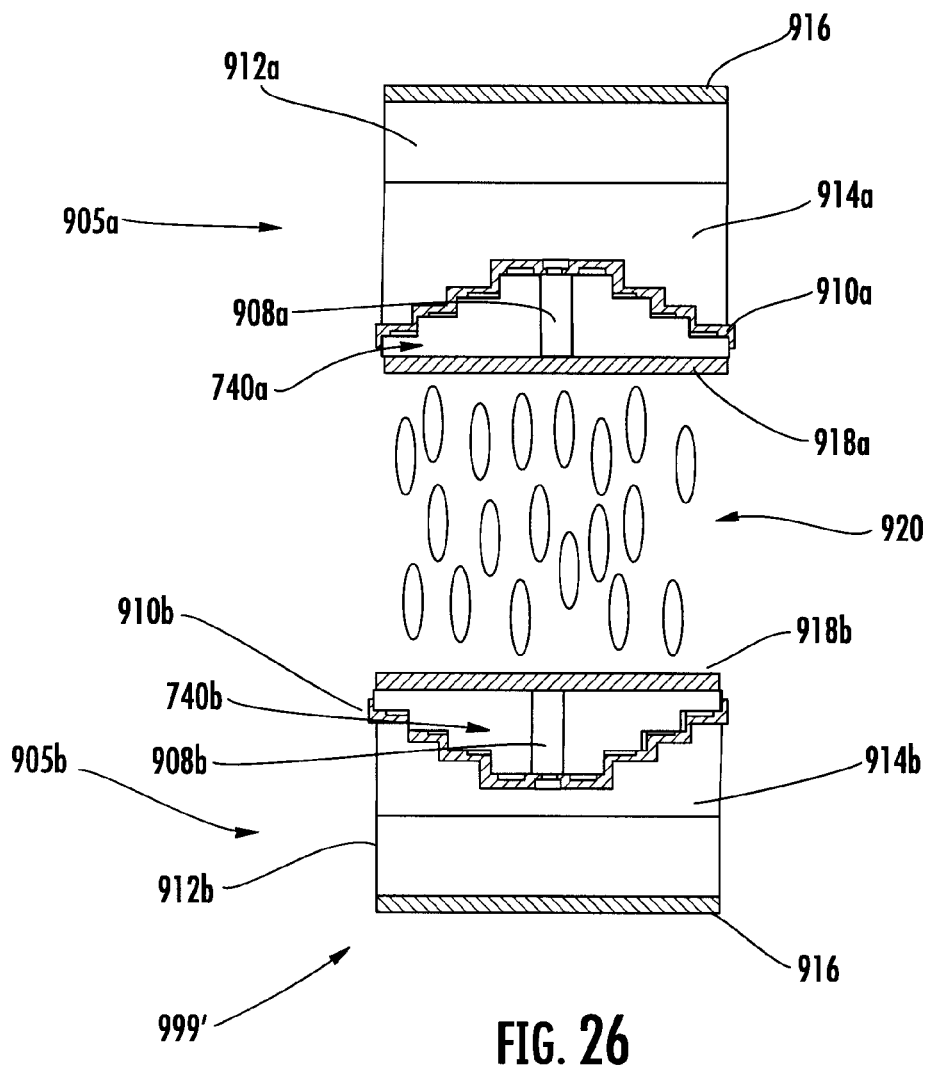
FIG. 26 is a schematic sectional view similar to that of FIG. 25, through part of a device in accordance with another example embodiment.

FIG. 26 illustrates pixel 999', another embodiment of pixel 999. The display pixel 999' of FIG. 26 is similar to that of FIG. 25 except that the second cell wall assembly 905b is constructed similarly to that of the first cell wall assembly 905a. Multi-level layer 740 separates the second electrode structures 910b from the LC 920. The second cell wall assembly 905b may be constructed by a similar transfer method to that used to make the first cell wall assembly 905a. The transparent adhesive 914b of the second cell wall assembly 905b may be formed of the same adhesive material as the transparent adhesive 914a of the first cell wall assembly. In this arrangement, the shortest distance between the LC material 920 and one of the first electrode structures 910a varies within the area of the pixel, as does the shortest distance between the LC material 920 and one of the second multi-level layer 740b. In this arrangement the cell may be symmetrical in a plane through the LC layer 920 parallel to the cell walls 912 and may be more easily constructed because the electrode variation may be shared between the two cell wall assemblies.

Figure 27:
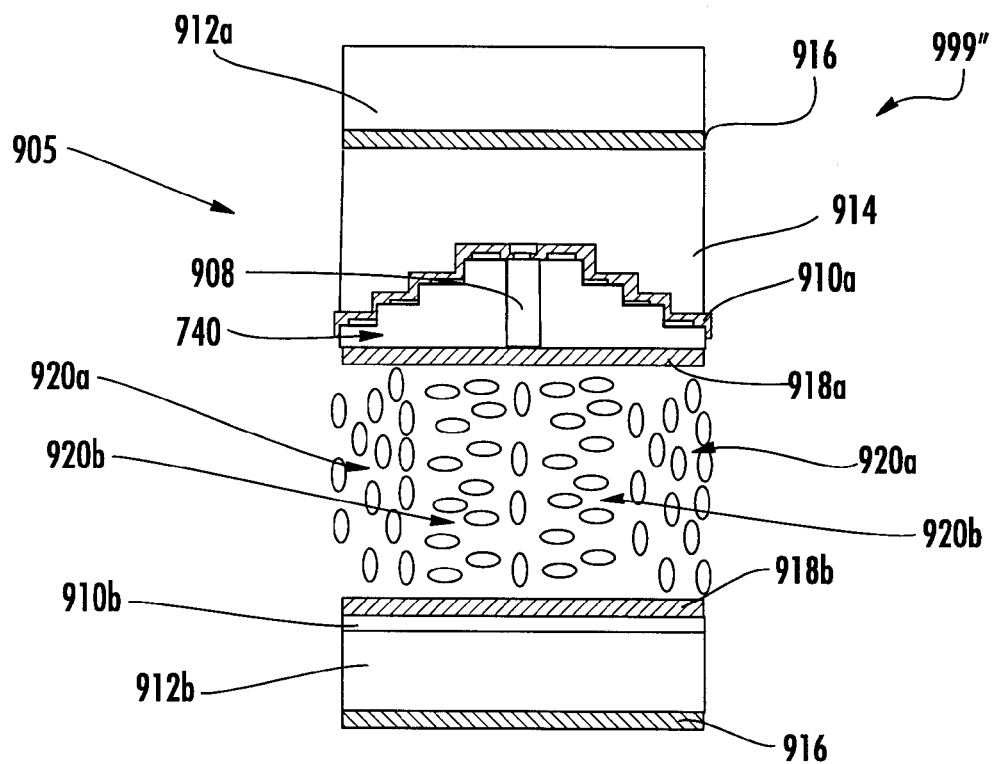
FIG. 27 is a similar view to FIG. 25, of another embodiment of a liquid crystal display device in accordance with another example embodiment.

FIG. 27 illustrates pixel 999", another embodiment of pixel 999 in which the polariser 916 on the upper cell wall 912a is provided on an inner surface, in this example between the first cell wall 912a and the adhesive 914, so that birefringence of the first cell wall 912a does not affect the display appearance. The switching voltage differs according to the shortest distance of the electrode structure 910a and the LC molecules 920. Each Multi-level layer 740 increases the switching threshold voltage. In order to switch the LC between stable states the electric field applied across the LC has to exceed a threshold. By putting the dielectric step between the electrode and the LC the electric field experienced by the LC will be reduced. Thus the applied voltage needed to switch the LC can be controlled by varying the thickness of the steps. In the illustration in FIG. 25, sufficient voltage has been applied via electrode structures 910a and 910b to align LC molecules 920a, in the outer regions, in the 'on' state. The applied voltage was insufficient to switch LC molecules 920b, in inner regions, from the 'off' state. Increasing the amplitude of a switching pulse will cause more of the steps to switch and hence increase the proportion of the device that switches into one of the two states, ultimately reaching a fully-switched state as illustrated in FIG. 25. The eye averages the areas of the pixel that are in each state to give a perceived grey level. LC molecules under the busbar 908 in FIG. 27 are switched, but are not visible under the opaque busbar. The busbar is narrow (about 5 μm) so is not readily visible.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
a first electrode;
a second electrode;
a first polymeric layer between the first electrode and the second electrode, the first polymeric layer having portions, each portion including a specific amount of a cross-linking agent, wherein the each portion has a distinct thickness for the specific amount of cross-linking agent:
an electro-optical material between the first polymeric layer and the first electrode; and
a second polymeric layer on an opposite side of the electro-optical material as the first polymeric layer, the second polymeric layer having second portions, each portion of the second polymeric layer including a specific amount of a cross-linking agent, wherein the each portion of the second polymeric layer has a distinct thickness for the specific amount of cross-linking agent, wherein the second polymeric layer includes multiple levels on the same side of the second polymeric layer as the first electrode, wherein the first polymeric layer includes multiple levels on the same side of the first polymeric layer as the second electrode, wherein the multiple levels of the first polymeric layer face in a first direction orthogonal to and towards the second electrode and wherein the multiple levels of the second polymeric layer face in a second direction orthogonal to and towards the first electrode, the second direction being opposite to the first direction.

2. An apparatus comprising:
a first electrode;
a second electrode;
a first polymeric layer between the first electrode and the second electrode, the first polymeric layer having portions, each portion including a specific amount of a cross-linking agent, wherein the each portion has a distinct thickness for the specific amount of cross-linking agent;
an electro-optical material between the first polymeric layer and the first electrode; and
a second polymeric layer on an opposite side of the electro-optical material as the first polymeric layer, the second polymeric layer having second portions, each portion of the second polymeric layer including a specific amount of a cross-linking agent, wherein the each portion of the second polymeric layer has a distinct thickness for the specific amount of cross-linking agent, wherein the second polymeric layer includes multiple levels on the same side of the second polymeric layer as the first electrode, wherein the first polymeric layer includes multiple levels facing towards the first electrode and wherein the multiple levels of the second polymeric layer face towards the first electrode.

3. The apparatus of claim 2, wherein the first electrode comprises a layer of electrically conductive material having a plurality of levels, the plurality levels undulating in unison with the multiple levels of the second polymeric layer.

4. The apparatus of claim 3, wherein the layer of electrically conductive material contacts the multiple levels of the second polymeric material.

5. The apparatus of claim 2, wherein the first electrode comprises a first layer of electrically conductive material having a plurality of levels, the plurality of levels undulating in unison with the multiple levels of the second polymeric layer.

6. The apparatus of claim 5, wherein the first layer of electrically conductive material contacts the multiple levels of the second polymeric material.

7. The apparatus of claim 6, wherein the second electrode comprises a second layer of electrically conductive material contacting the multiple levels of the first polymeric material and having a plurality of levels undulating in unison with the multiple levels of the first polymeric layer.

8. The apparatus of claim 2, wherein the first polymeric layer includes at least three portions.

9. The apparatus of claim 2, wherein the first polymeric layer includes a photo-polymer.

10. The apparatus of claim 2, wherein the first polymeric layer includes bisphenol A epoxy resin.

11. The apparatus of claim 2, wherein the first polymeric layer includes at least 20% by solids of bisphenol A diglycidyl ether (BADGE) relative to 100% by solids of the first layer.

12. The apparatus of claim 2, wherein the first polymeric layer is transparent and wherein the first electrode is transparent.

13. The apparatus of claim 2, wherein the first polymeric layer is transparent and wherein the first electrode is reflective.

14. The apparatus of claim 2, wherein the first polymeric layer is opaque.

15. The apparatus of claim 2, wherein at least a percentage of at least one portion of the second portions of the second polymeric layer is ramped.

16. The apparatus of claim 2, wherein the each portion has a different degree of cross-linking.

* * * * *